US012572813B2

(12) United States Patent
Guo et al.

(10) Patent No.: US 12,572,813 B2
(45) Date of Patent: Mar. 10, 2026

(54) SYSTEMS, METHODS, AND APPARATUSES FOR IMPLEMENTING DISCRIMINATIVE, RESTORATIVE, AND ADVERSARIAL (DiRA) LEARNING USING STEPWISE INCREMENTAL PRE-TRAINING FOR MEDICAL IMAGE ANALYSIS

(71) Applicant: Arizona Board of Regents on behalf of Arizona State University, Scottsdale, AZ (US)

(72) Inventors: Zuwei Guo, Phoenix, AZ (US); Nahid Ul Islam, Mesa, AZ (US); Jianming Liang, Scottsdale, AZ (US)

(73) Assignee: Arizona Board of Regents on Behalf of Arizona State University, Scottsdale, AZ (US)

( * ) Notice: Subject to any disclaimer, the term of this patent is extended or adjusted under 35 U.S.C. 154(b) by 316 days.

(21) Appl. No.: 18/241,811

(22) Filed: Sep. 1, 2023

(65) Prior Publication Data

US 2024/0078434 A1        Mar. 7, 2024

Related U.S. Application Data

(60) Provisional application No. 63/403,596, filed on Sep. 2, 2022, provisional application No. 63/403,609, filed on Sep. 2, 2022.

(51) Int. Cl.
　　G06K 9/00　　　　(2022.01)
　　G06N 3/0455　　　(2023.01)
　　　　　　(Continued)

(52) U.S. Cl.
　　CPC ......... G06N 3/0895 (2023.01); G06N 3/0455 (2023.01); G06T 7/0012 (2013.01);
　　　　　　(Continued)

(58) Field of Classification Search
　　CPC .. G06N 3/0895; G06N 3/0455; G06T 7/0012; G06T 2207/20081; G06T 2207/20084;
　　　　　　(Continued)

(56) References Cited

U.S. PATENT DOCUMENTS

2020/0372282 A1 * 11/2020 Chang .................. G06V 10/764
2021/0396799 A1 * 12/2021 Cui ...................... G01R 31/086
　　　　　　(Continued)

FOREIGN PATENT DOCUMENTS

WO　　WO-2021148625 A1 *　7/2021　............. G06N 3/088

OTHER PUBLICATIONS

Armato III, S. G., McLennan, G., Bidaut, L., McNitt-Gray, M. F., Meyer, C. R., Reeves, A. P., . . . & Clarke, L. P. (2011). The lung image database consortium (LIDC) and image database resource initiative (IDRI): a completed reference database of lung nodules on CT scans. Medical physics, 38(2), 915-931.
　　　　　　(Continued)

*Primary Examiner* — Xin Jia
(74) *Attorney, Agent, or Firm* — Elliott, Ostrander & Preston, P.C.

(57)　　　　ABSTRACT

The system receives a plurality of medical images and integrates Self-Supervised machine Learning (SSL) instructions for performing a discriminative learning operation, a restorative learning operation, and an adversarial learning operation into a model for processing the received plurality of medical images. The model is configured with each of a discriminative encoder, a restorative decoder, and an adversarial encoder. Each of the discriminative encoder and the restorative decoder are configured to be skip connected, forming an encoder-decoder. Step-wise incremental training to incrementally train each of the discriminative encoder, the restorative decoder, and the adversarial encoder is performed, in particular: pre-training the discriminative
　　　　　　(Continued)

100 encoder via discriminative learning; attaching the pre-trained discriminative encoder to the restorative decoder to configure the encoder-decoder as a pre-trained encoder-decoder; and training the pre-trained encoder-decoder of the model using joint discriminative and restorative learning. The pre-trained encoder-decoder is associated with the adversarial encoder. The pre-trained encoder-decoder associated with the adversarial encoder is trained through discriminative, restorative, and adversarial learning to render a trained model for the processing of the received plurality of medical images. The plurality of medical images are processed through the model using the trained model.

18 Claims, 20 Drawing Sheets

(51) Int. Cl.

| | |
|---|---|
| *G06N 3/0895* | (2023.01) |
| *G06T 7/00* | (2017.01) |
| *G06V 10/774* | (2022.01) |
| *G06V 10/82* | (2022.01) |
| *G06V 20/50* | (2022.01) |
| *G06V 20/70* | (2022.01) |

(52) U.S. Cl.
CPC ............ *G06V 10/774* (2022.01); *G06V 10/82* (2022.01); *G06V 20/50* (2022.01); *G06V 20/70* (2022.01); *G06T 2207/20081* (2013.01); *G06T 2207/20084* (2013.01); *G06T 2207/30004* (2013.01); *G06V 2201/03* (2022.01)

(58) Field of Classification Search
CPC ........ G06T 2207/30004; G06V 10/774; G06V 10/82; G06V 20/50; G06V 20/70; G06V 2201/00
See application file for complete search history.

(56) References Cited

U.S. PATENT DOCUMENTS

| | | | |
|---|---|---|---|
| 2022/0027792 A1* | 1/2022 | Cummings | ............ G06N 20/00 |
| 2024/0078666 A1 | 3/2024 | Pang | |

OTHER PUBLICATIONS

Bakas, S., Reyes, M., Jakab, A., Bauer, S., Rempfler, M., Crimi, A., . . . & Jambawalikar, S. R. (2018). Identifying the best machine learning algorithms for brain tumor segmentation, progression assessment, and overall survival prediction in the BRATS challenge. arXiv preprint arXiv:1811.02629.

Bao, H., Dong, L., Piao, S., & Wei, F. (2021). Beit: Bert pre-training of image transformers. arXiv preprint arXiv:2106.08254.

Bilic, P., Christ, P., Li, H. B., Vorontsov, E., Ben-Cohen, A., Kaissis, G., . . . & Menze, B. (2019). The Liver Tumor Segmentation Benchmark (LiTS). arXiv preprint arXiv:1901.04056.

Brown, T., Mann, B., Ryder, N., Subbiah, M., Kaplan, J. D., Dhariwal, P., . . . & Amodei, D. (2020). Language models are few-shot learners. Advances in neural information processing systems, 33, 1877-1901.

Caron, Mathilde, et al. "Deep clustering for unsupervised learning of visual features." Proceedings of the European conference on computer vision (ECCV). 2018.

Caron, M., Touvron, H., Misra, I., Jegou, H., Mairal, J., Bojanowski, P., & Joulin, A. (2021). Emerging properties in self-supervised vision transformers. In Proceedings of the IEEE/CVF international conference on computer vision (pp. 9650-9660).

Chen, X., Xie, S., & He, K. (2021). An empirical study of training self-supervised vision transformers. In Proceedings of the IEEE/CVF international conference on computer vision (pp. 9640-9649).

Chen, X., & He, K. (2021). Exploring simple siamese representation learning. In Proceedings of the IEEE/CVF conference on computer vision and pattern recognition (pp. 15750-15758).

Chen, Xinlei, et al. "Improved baselines with momentum contrastive learning." arXiv preprint arXiv:2003.04297 (2020).

Çiçek, Ö., Abdulkadir, A., Lienkamp, S. S., Brox, T., & Ronneberger, O. (2016). 3D U-Net: learning dense volumetric segmentation from sparse annotation. In Medical Image Computing and Computer-Assisted Intervention—MICCAI 2016: 19th International Conference, Athens, Greece, Oct. 17-21, 2016, Proceedings, Part II 19 (pp. 424-432). Springer International Publishing.

Deng, J., Dong, W., Socher, R., Li, L. J., Li, K., & Fei-Fei, L. (Jun. 2009). Imagenet: A large-scale hierarchical image database. In 2009 IEEE conference on computer vision and pattern recognition (pp. 248-255). Ieee.

Devlin, J., Chang, M. W., Lee, K., & Toutanova, K. (Jun. 2019). Bert: Pre-training of deep bidirectional transformers for language understanding. In Proceedings of the 2019 conference of the North American chapter of the association for computational linguistics: human language technologies, vol. 1 (long and short papers) (pp. 4171-4186).

Doersch, C., Gupta, A., & Efros, A. A. (2015). Unsupervised visual representation learning by context prediction. In Proceedings of the IEEE international conference on computer vision (pp. 1422-1430).

Dosovitskiy, A., Beyer, L., Kolesnikov, A., Weissenborn, D., Zhai, X., Unterthiner, T., . . . & Houlsby, N. (2020). An image is worth 16x16 words: Transformers for image recognition at scale. arXiv preprint arXiv:2010.11929.

Gidaris, Spyros, et al., "Unsupervised representation learning by predicting image rotations." arXiv preprint arXiv:1803.07728 (2018).

Guo, Z., Islam, N. U., Gotway, M. B., & Liang, J. (Sep. 2022). Discriminative, restorative, and adversarial learning: Stepwise incremental pretraining. In MICCAI Workshop on Domain Adaptation and Representation Transfer (pp. 66-76). Cham: Springer Nature Switzerland.

Haghighi, F., Taher, M. R. H., Zhou, Z., Gotway, M. B., & Liang, J. (2021). Transferable visual words: Exploiting the semantics of anatomical patterns for self-supervised learning. IEEE transactions on medical imaging, 40(10), 2857-2868.

Haghighi, F., Hosseinzadeh Taher, M. R., Zhou, Z., Gotway, M. B., & Liang, J. (2020). Learning semantics-enriched representation via self-discovery, self-classification, and self-restoration. In Medical Image Computing and Computer Assisted Intervention—MICCAI 2020: 23rd International Conference, Lima, Peru, Oct. 4-8, 2020, Proceedings, Part I 23 (pp. 137-147). Springer International Publishing.

Haghighi, F., Taher, M. R. H., Gotway, M. B., & Liang, J. (2022). Dira: Discriminative, restorative, and adversarial learning for self-supervised medical image analysis. In Proceedings of the IEEE/CVF Conference on Computer Vision and Pattern Recognition (pp. 20824-20834).

He, K., Chen, X., Xie, S., Li, Y., Dollár, P., & Girshick, R. (2022). Masked autoencoders are scalable vision learners. In Proceedings of the IEEE/CVF conference on computer vision and pattern recognition (pp. 16000-16009).

He, K., Fan, H., Wu, Y., Xie, S., & Girshick, R. (2020). Momentum contrast for unsupervised visual representation learning. In Proceedings of the IEEE/CVF conference on computer vision and pattern recognition (pp. 9729-9738).

Taher, M. R. H., Haghighi, F., Gotway, M. B., & Liang, J. (Dec. 2022). CAID: Context-aware instance discrimination for self-supervised learning in medical imaging. In International Conference on Medical Imaging with Deep Learning (pp. 535-551). PMLR.

Taher, M. R. H., Haghighi, F., Feng, R., Gotway, M. B., Liang, J. (2021). A Systematic Benchmarking Analysis of Transfer Learning for Medical Image Analysis. In: Albarqouni, S., et al. Domain Adaptation and Representation Transfer, and Affordable Healthcare and AI for Resource Diverse Global Health. Dart Fair 2021 2021. Lecture Notes in Computer Science(), vol. 12968. Springer, Cham. https://doi.org/10.1007/978-3-030-87722-4_1.

(56) References Cited

OTHER PUBLICATIONS

Irvin, J., Rajpurkar, P., Ko, M., Yu, Y., Ciurea-Ilcus, S., Chute, C., . . . & Ng, A. Y. (Jul. 2019). Chexpert: A large chest radiograph dataset with uncertainty labels and expert comparison. In Proceedings of the AAAI conference on artificial intelligence (vol. 33, No. 01, pp. 590-597).

Jaeger, S., Candemir, S., Antani, S., Wang, Y. X. J., Lu, P. X., & Thoma, G. (2014). Two public chest X-ray datasets for computer-aided screening of pulmonary diseases. Quantitative imaging in medicine and surgery, 4(6), 475.

Jing, L. & Y. Tian. (2021). Self-Supervised Visual Feature Learning With Deep Neural Networks: A Survey. In IEEE Transactions on Pattern Analysis and Machine Intelligence, vol. 43, No. 11, pp. 4037-4058. doi: 10.1109/TPAMI.2020.2992393.

Liang, J., & Bi, J. (Jul. 2007). Computer aided detection of pulmonary embolism with tobogganing and mutiple instance classification in CT pulmonary angiography. In Biennial international conference on information processing in medical imaging (pp. 630-641). Berlin, Heidelberg: Springer Berlin Heidelberg.

Liu, Z., Lin, Y., Cao, Y., Hu, H., Wei, Y., Zhang, Z., . . . & Guo, B. (2021). Swin transformer: Hierarchical vision transformer using shifted windows. In Proceedings of the IEEE/CVF international conference on computer vision (pp. 10012-10022).

Menze, Bjoern H., et al. "The multimodal brain tumor image segmentation benchmark (BRATS)." IEEE transactions on medical imaging 34.10 (2014): 1993-2024.

Noroozi, M., & Favaro, P. (Sep. 2016). Unsupervised learning of visual representations by solving jigsaw puzzles. In European conference on computer vision (pp. 69-84). Cham: Springer International Publishing.

Pang, J. et al. (2022). POPAR: Patch Order Prediction and Appearance Recovery for Self-supervised Medical Image Analysis. In: Kamnitsas, K., et al. Domain Adaptation and Representation Transfer. DART 2022. Lecture Notes in Computer Science, vol. 13542. Springer, Cham. https://doi.org/10.1007/978-3-031-16852-9_8.

Ronneberger, O., Fischer, P., Brox, T. (2015). U-Net: Convolutional Networks for Biomedical Image Segmentation. In: Navab, N., Hornegger, J., Wells, W., Frangi, A. (eds) Medical Image Computing and Computer-Assisted Intervention—MICCAI 2015. MICCAI 2015. Lecture Notes in Computer Science(), vol. 9351. Springer, Cham. https://doi.org/10.1007/978-3-319-24574-4_28.

Schwichtenberg, J. (2018). Physics from symmetry. Springer.

Setio, A. A. A., Traverso, A., de Bel, T., Berens, M. S., Bogaard, C. van den, Cerello, P., Chen, H., Dou, Q., Fantacci, M. E., Geurts, B., Gugten, R. van der, Heng, P. A., Jansen, B., de Kaste, M. M., Kotov, V., Lin, J. Y.-H., Manders, J. T., Sóñora-Mengana, A., García-Naranjo, J. C., & Papavasileiou, E. (2017). Validation, comparison, and combination of algorithms for automatic detection of pulmonary nodules in computed tomography images: The LUNA16 challenge. Medical Image Analysis., 42, 1-13. https://doi.org/10.1016/j.media.2017.06.015.

Siddique, N., Paheding, S., Elkin, C. P., & Devabhaktuni, V. (2021). U-net and its variants for medical image segmentation: A review of theory and applications. IEEE access, 9, 82031-82057.

Tajbakhsh, N., Gotway, M. B., & Liang, J. (2015). Computer-aided pulmonary embolism detection using a novel vessel-aligned multi-planar image representation and convolutional neural networks. In Medical Image Computing and Computer-Assisted Intervention—MICCAI 2015: 18th International Conference, Munich, Germany, Oct. 5-9, 2015, Proceedings, Part II 18 (pp. 62-69). Springer International Publishing.

Tajbakhsh, N., Roth, H., Terzopoulos, D., & Liang, J. (2021). Guest editorial annotation-efficient deep learning: the holy grail of medical imaging. IEEE transactions on medical imaging, 40(10), 2526-2533.

Taleb, A., Loetzsch, W., Danz, N., Severin, J., Gaertner, T., Bergner, B., & Lippert, C. (2020). 3d self-supervised methods for medical imaging. Advances in neural information processing systems, 33, 18158-18172.

Touvron, H., Cord, M., Douze, M., Massa, F., Sablayrolles, A., & Jegou, H. (Jul. 2021). Training data-efficient image transformers & distillation through attention. In International conference on machine learning (pp. 10347-10357). PMLR.

Wang, X., Peng, Y., Lu, L., Lu, Z., Bagheri, M., & Summers, R. M. (Jul. 2017). ChestX-Ray8: Hospital-Scale Chest X-Ray Database and Benchmarks on Weakly-Supervised Classification and Localization of Common Thorax Diseases. In 2017 IEEE Conference on Computer Vision and Pattern Recognition (CVPR) (pp. 3462-3471). IEEE.

Xie, Z., Zhang, Z., Cao, Y., Lin, Y., Bao, J., Yao, Z., . . . & Hu, H. (2022). Simmim: A simple framework for masked image modeling. In Proceedings of the IEEE/CVF conference on computer vision and pattern recognition (pp. 9653-9663).

Zbontar, J., Jing, L., Misra, I., LeCun, Y., & Deny, S. (Jul. 2021). Barlow twins: Self-supervised learning via redundancy reduction. In International conference on machine learning (pp. 12310-12320). PMLR.

Zhou, Zongwei, et al. "Models genesis." Medical image analysis 67 (2021): 101840.

Zhuang, X., Li, Y., Hu, Y., Ma, K., Yang, Y., Zheng, Y. (2019). Self-supervised Feature Learning for 3D Medical Images by Playing a Rubik's Cube. In: Shen, D., et al. Medical Image Computing and Computer Assisted Intervention—MICCAI 2019. MICCAI 2019. Lecture Notes in Computer Science(), vol. 11767. Springer, Cham. https://doi.org/10.1007/978-3-030-32251-9_46.

Colak, E. et al., "The RSNA Pulmonary Embolism CT Dataset," Radiology: Artificial Intelligence, vol. 3, No. 2, 2021, 7 pages.

* cited by examiner

| Method | Approach | BMS | NCC | LCS | ECC | NCS |
|---|---|---|---|---|---|---|
| Jigsaw | (D+R+A) | 64.98±0.68 | 97.24±0.73 | 83.54±0.95 | 84.12±1.38 | 74.32±1.54 |
| | (((D)+R)+A) | 66.07±1.33 | 97.86±1.54 | 84.87±1.67 | 84.89±1.05 | 74.87±1.17 |
| Rubik's Cube | (D+R+A) | 65.13±1.34 | 98.21±0.88 | 84.12±1.19 | 84.36±1.17 | 75.18±1.32 |
| | (((D)+R)+A) | 66.88±1.72 | 99.17±0.79 | 85.18±0.99 | 85.64±0.87 | 76.07±1.23 |
| TransVW Adv. | (D+R+A) | 66.81±1.06 | 97.63±0.52 | 85.16±0.67 | 85.84±1.84 | 76.32±1.25 |
| | (((D)+R)+A) | 69.57±1.13 | 98.87±0.61 | 86.85±0.81 | 86.91±3.27 | 77.51±1.36 |

TABLE 1

501

| Method | Approach | Decoder | NCC | ECC |
|---|---|---|---|---|
| Random | - | ✗ | 94.25±5.07 | 79.99+8.06 |
| Jigsaw | D | ✗ | 94.49±1.24 | 81.79±1.04 |
|  | (D)+R | ✓ | 97.29±1.09* | 84.39±1.47***** |
| Rubik's Cube | D | ✗ | 96.24±1.57 | 81.76±1.32 |
|  | (D)+R | ✓ | 98.14±0.38* | 84.14±1.58***** |
| Deep Clustering | D | ✗ | 97.27±1.43 | 84.82±0.62 |
|  | (D)+R | ✓ | 98.11±0.55 | 85.12±1.37 |
| TransVW | D | ✗ | 97.49±0.45 | 84.25±3.91 |
|  | (D)+R | ✓ | 98.47±0.22* | 87.07±2.83* |
| Rotation | D | ✗ | 96.13±2.41 | 82.37±1.64 |
|  | (D)+R | ✓ | 97.17±0.81 | 83.57±1.21* |

TABLE 2

601

701

| Method | Approach | Decoder | NCC | LCS | BMS |
|---|---|---|---|---|---|
| Random | - | X | 74.05±1.97 | 77.82±3.87 | 58.52±2.61 |
| Jigsaw | D | X | 73.38±1.65 | 82.04±1.65 | 63.33±1.11 |
| | (D)+R | ✓ | 73.38±1.26 | 83.04±1.21 | 64.17±0.62 |
| | (D)+R | ✓ | 74.53±1.13* | 84.17±1.48* | 65.33±1.31* |
| Rubik's Cube | D | X | 72.87±0.86 | 77.42±0.43 | 62.75±1.93 |
| | (D)+R | ✓ | 74.33±1.83 | 84.21±0.24 | 64.91±0.76 |
| | (D)+R | ✓ | 75.66±0.74* | 85.02±1.08* | 65.83±1.16* |
| Deep Clustering | D | X | 74.82±0.47 | 82.67±0.69 | 65.81±0.73 |
| | (D)+R | ✓ | 75.01±0.69 | 83.75±0.9 | 66.14±0.87 |
| | (D)+R | ✓ | 75.91±1.12* | 84.63±0.63* | 66.73±0.51* |
| TransVW | D | X | 76.98±0.87 | 85.09±2.15 | 64.02±0.98 |
| | (D)+R | ✓ | 77.09±1.52 | 85.63±0.96 | 67.52±0.87 |
| | (D)+R | ✓ | 77.33±0.52 | 86.53±1.31* | 68.82±0.38* |
| Rotation | D | X | 74.24±0.91 | 82.44±1.45 | 63.98±0.84 |
| | (D)+R | ✓ | 74.65±1.26 | 83.24±2.21 | 64.54±1.36 |
| | (D)+R | ✓ | 74.86±0.58* | 84.65±1.01* | 65.44±0.67* |

TABLE 3

FIG. 7

| Method | Approach | BMS | NCS | ECC |
|---|---|---|---|---|
| Jigsaw | (D+R) | 64.44±0.97 | 73.6±1.48 | 83.84±1.02 |
| | ((D)+R) | 65.33±1.31*** | 74.53±1.13*** | 84.49±1.38*** |
| | ((R)+D) | 64.14±0.81 | 73.71±0.78 | 83.66±1.2 |
| | ((R)+A) | 64.21±0.97 | 73.33±0.47 | 83.44±0.93 |
| | (D+R+A) | 64.98±0.68 | 74.32±1.32 | 84.12±1.38 |
| | (((D)+R)+A) | 66.07±1.33*** | 74.87±1.17*** | 84.49±1.05*** |
| | (((R)+D)+A) | 65.03±1.24 | 73.96±0.97 | 83.94±1.48 |
| | (((R)+A)+D) | 64.97±0.91 | 73.57±1.88 | 84.02±1.7 |
| Deep Clustering | (D+R) | 64.53±0.81 | 74.24±1.63 | 84.13±1.89 |
| | ((D)+R) | 66.73±0.51 | 75.91±1.12 | 85.12±1.37 |
| | ((R)+D) | 67.58±0.34*** | 76.32±0.78 | 85.41±0.94* |
| | ((R)+A) | 67.34±0.91 | 76.61±0.76*** | 85.28±0.73 |
| | (D+R+A) | 65.9±1.72 | 74.66±1.89 | 84.57±1.66 |
| | (((D)+R)+A) | 67.22±2.33 | 76.38±1.63 | 84.82±0.62 |
| | (((R)+D)+A) | 68.36±1.14** | 77.25±1.11** | 85.57±1.84 |
| | (((R)+A)+D) | 68.22±0.86 | 76.71±1.24 | 85.69±1.41*** |

801

TABLE 4

FIG. 8

| Method | Adv. | MSE ($\downarrow$) | FID ($\downarrow$) | MS-SSIM ($\uparrow$) |
|---|---|---|---|---|
| Jigsaw | ✗ | 0.0168±0.0024 | 338.245 | 0.8335±0.0024 |
|  | ✓ | 0.0143±0.0017 | 317.354 | 0.8724±0.0012 |
| Rubik's Cube | ✗ | 0.0139±0.0011 | 314.323 | 0.8856±0.0015 |
|  | ✓ | 0.0115±0.0005 | 257.698 | 0.9127±0.0007 |
| Deep Clustering | ✗ | 0.0123±0.0019 | 295.645 | 0.8973±0.0021 |
|  | ✓ | 0.0108±0.0012 | 244.742 | 0.9268±0.0018 |
| TransVW | ✗ | 0.0289±0.0027 | 427.562 | 0.7383±0.0032 |
|  | ✓ | 0.0109±0.0015 | 251.325 | 0.9088±0.0015 |
| Rotation | ✗ | 0.0184±0.0052 | 356.32 | 0.7914±0.0032 |
|  | ✓ | 0.0129±0.0021 | 309.214 | 0.8932±0.0028 |

TABLE 5

901

Equation (1)

$$\mathcal{L}_d = -\sum_{n=1}^{N}\sum_{k=1}^{K} y_{nk}\ln(p_{nk})$$

Equation (2)

$$\mathcal{L}_r = \mathbb{E}_x\; L_2(x, R_{\theta'}(D_\theta(\mathcal{T}(x))))$$

Equation (3)

$$\mathcal{L}_a = E_{x,\mathcal{T}(x)}\log A_{\theta''}(\mathcal{T}(x),x) + E_x\log(1 - A_{\theta''}(\mathcal{T}(x),R_{\theta'}(D_\theta(\mathcal{T}(x)))))$$

Equation (4)

$$\mathcal{L} = \lambda_d\mathcal{L}_d + \lambda_r\mathcal{L}_r + \lambda_a\mathcal{L}_a$$

SYSTEMS, METHODS, AND APPARATUSES FOR IMPLEMENTING DISCRIMINATIVE, RESTORATIVE, AND ADVERSARIAL (DiRA) LEARNING USING STEPWISE INCREMENTAL PRE-TRAINING FOR MEDICAL IMAGE ANALYSIS

CROSS REFERENCE TO RELATED APPLICATIONS

The present application claims priority under 35 U.S.C. § 119 (e) to U.S. Provisional Patent Application No. 63/403,596, filed Sep. 2, 2022, and U.S. Provisional Patent Application No. 63/403,609, filed Sep. 2, 2022, the entire contents of each of which are hereby incorporated by reference. This non-provisional application is related to U.S. Non-Provisional patent application Ser. No. 18/241,809, filed Sep. 1, 2023, entitled "SYSTEMS, METHODS, AND APPARATUSES FOR IMPLEMENTING PATCH ORDER PREDICTION AND APPEARANCE RECOVERY (POPAR) BASED IMAGE PROCESSING FOR SELF-SUPERVISED LEARNING MEDICAL IMAGE ANALYSIS", the entire contents of which are incorporated herein by reference.

GOVERNMENT RIGHTS AND GOVERNMENT AGENCY SUPPORT NOTICE

This invention was made with government support under R01 HL128785 awarded by the National Institutes of Health. The government has certain rights in the invention.

COPYRIGHT NOTICE

TECHNICAL FIELD

Embodiments of the invention relate generally to the field of medical imaging and analysis using convolutional neural networks for the classification and annotation of medical images, and more particularly, to systems, methods, and apparatuses for implementing Discriminative, Restorative, and Adversarial (DiRA) learning using stepwise incremental pre-training for medical image analysis, in the context of processing of medical imaging.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed inventions.

Machine learning models have various applications to automatically process inputs and produce outputs considering situational factors and learned information to improve output quality. One area where machine learning models, and neural networks in particular, provide high utility is in the field of processing medical images.

Within the context of machine learning and with regard to deep learning specifically, a Convolutional Neural Network (CNN, or ConvNet) is a class of deep neural networks, very often applied to analyzing visual imagery. Convolutional Neural Networks are regularized versions of multilayer perceptrons. Multilayer perceptrons are fully connected networks, such that each neuron in one layer is connected to all neurons in the next layer, a characteristic which often leads to a problem of overfitting of the data and the need for model regularization. Convolutional Neural Networks also seek to apply model regularization, but with a distinct approach. Specifically, CNNs take advantage of the hierarchical pattern in data and assemble more complex patterns using smaller and simpler patterns. Consequently, on the scale of connectedness and complexity, CNNs are on the lower extreme.

The present state of the art may therefore benefit from the systems, methods, and apparatuses for implementing Discriminative, Restorative, and Adversarial (DiRA) learning using stepwise incremental pre-training for medical image analysis, as is described herein.

BRIEF DESCRIPTION OF THE DRAWINGS

Embodiments are illustrated by way of example, and not by way of limitation, and can be more fully understood with reference to the following detailed description when considered in connection with the figures in which:

FIG. 7 depicts Table 3 which shows how incremental restorative learning ((D)+R) directly boosts target segmentation tasks, in accordance with described embodiments;

FIG. 8 depicts Table 4 which shows a comparison amongst different training strategies, in accordance with described embodiments;

FIG. 11 depicts each of equation (1), equation (2), equation (3), and equation (4) as utilized in conjunction with the United framework, in accordance with described embodiments.

DETAILED DESCRIPTION

Described herein are systems, methods, and apparatuses for implementing Discriminative, Restorative, and Adversarial (DiRA) learning using stepwise incremental pre-training for digital image analysis, for example, medical image analysis.

In the field of medical image analysis, uniting three self-supervised learning (SSL) ingredients (discriminative, restorative, and adversarial learning) enables collaborative representation learning and yields three transferable components: a discriminative encoder, a restorative decoder, and an adversarial encoder. To leverage this advantage, five prominent SSL methods have been redesigned, including Rotation, Jigsaw, Rubik's Cube, Deep Clustering, and TransVW methods, and formulated each in a United framework for three dimensional (3D) medical imaging. However, such a United framework increases model complexity and pre-training difficulty. To overcome this difficulty, a stepwise incremental pre-training strategy is utilized, in which a discriminative encoder is first trained via discriminative learning, the pre-trained discriminative encoder is then attached to a restorative decoder, forming a skip-connected encoder-decoder, for further joint discriminative and restorative learning, and finally, the pre-trained encoder-decoder is associated with an adversarial encoder for final full discriminative, restorative, and adversarial learning.

Experimental results demonstrate that the stepwise incremental pre-training stabilizes United models training, resulting in significant performance gains and annotation cost reduction via transfer learning for five target tasks, encompassing both classification and segmentation, across diseases, organs, datasets, and modalities.

The performance gains are attributed to the synergy of the three SSL ingredients in the United framework as described herein which is unleashed via the stepwise incremental pre-training.

Figure 1:
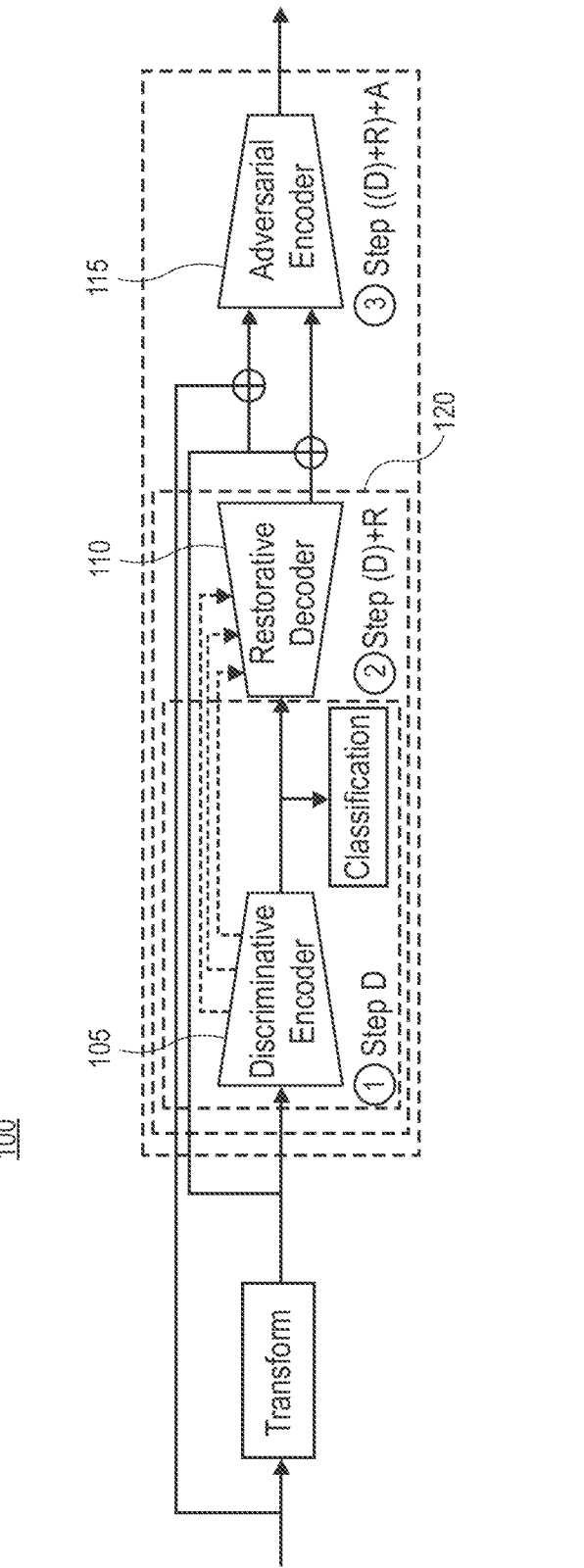
FIG. 1 depicts a novel "United Model" framework consisting of a discriminative encoder, a restorative decoder, and an adversarial encoder, in accordance with described embodiments.

FIG. 1 depicts a novel "United Model" framework 100 consisting of a discriminative encoder 105, a restorative decoder 110, and an adversary encoder 115, in accordance with described embodiments.

As depicted here, the "United model" consists of three components: a discriminative encoder 105, a restorative decoder 110, and an adversary encoder 115, where the discriminative encoder 105 and the restorative decoder 110 are skip connected, forming an encoder-decoder 120. A skip connection (i.e., shortcut connection), as the name suggests, skips a layer in a neural network and feeds an output of one layer as an input to a next layer. To overcome the United model complexity and pre-training difficulty, a novel strategy is used specifically to incrementally train the three components in a stepwise fashion, in which: (1) Step D trains the discriminative encoder via discriminative learning; (2) Step (D)+R attaches the pre-trained discriminative encoder to the restorative decoder for further joint discriminative and restorative learning; and (3) Step ((D)+R)+A associates the pre-trained encoder-decoder with the adversarial encoder for final full discriminative, restorative, and adversarial learning. This stepwise incremental pre-training has proven to be reliable across multiple SSL methods (see FIGS. 2A-2E below) for a variety of target tasks across diseases, organs, datasets, and modalities.

In accordance with the described embodiments, Self-Supervised Learning (SSL) techniques are used to pre-train generic source models without using expert annotation, thus allowing the pre-trained generic source models to be quickly fine-tuned into high-performance application-specific target models with minimal annotation cost.

The existing SSL methods may employ one or a combination of the following three learning ingredients: (1) discriminative learning, which pre-trains an encoder by distinguishing images associated with (computer-generated) pseudo labels; (2) restorative learning, which pre-trains an encoder-decoder by reconstructing original images from their distorted versions; and (3) adversarial learning, which pre-trains an additional adversarial encoder to enhance restorative learning. Certain embodiments integrate the three learning ingredients into one single framework for collaborative learning, thus yielding three learned components. Specifically, (1) a discriminative encoder 105, (2) a restorative decoder 110, and (3) an adversary encoder 115 as depicted by FIG. 1.

However, such integration inevitably increases model complexity and pre-training difficulty, which thus raises two questions: First, "How to optimally pre train such complex generic models?" and secondly, "How to effectively utilize pre trained components for target tasks?"

To answer these two questions, five prominent SSL methods are specially customized and redesigned for 3D imaging, including Rotation, Jigsaw, Rubik's Cube, Deep Clustering, and TransVW methods. Each of the methods is then formulated in a single framework called "United" (see FIGS. 2A-2E below), as the framework unites discriminative, restorative, and adversarial learning.

FIGS. 2A, 2B, 2C, 2D, and 2E depict a novel "United framework" in greater detail having specially re-designed SSL techniques integrated therein, in accordance with described embodiments.

Figure 2A:
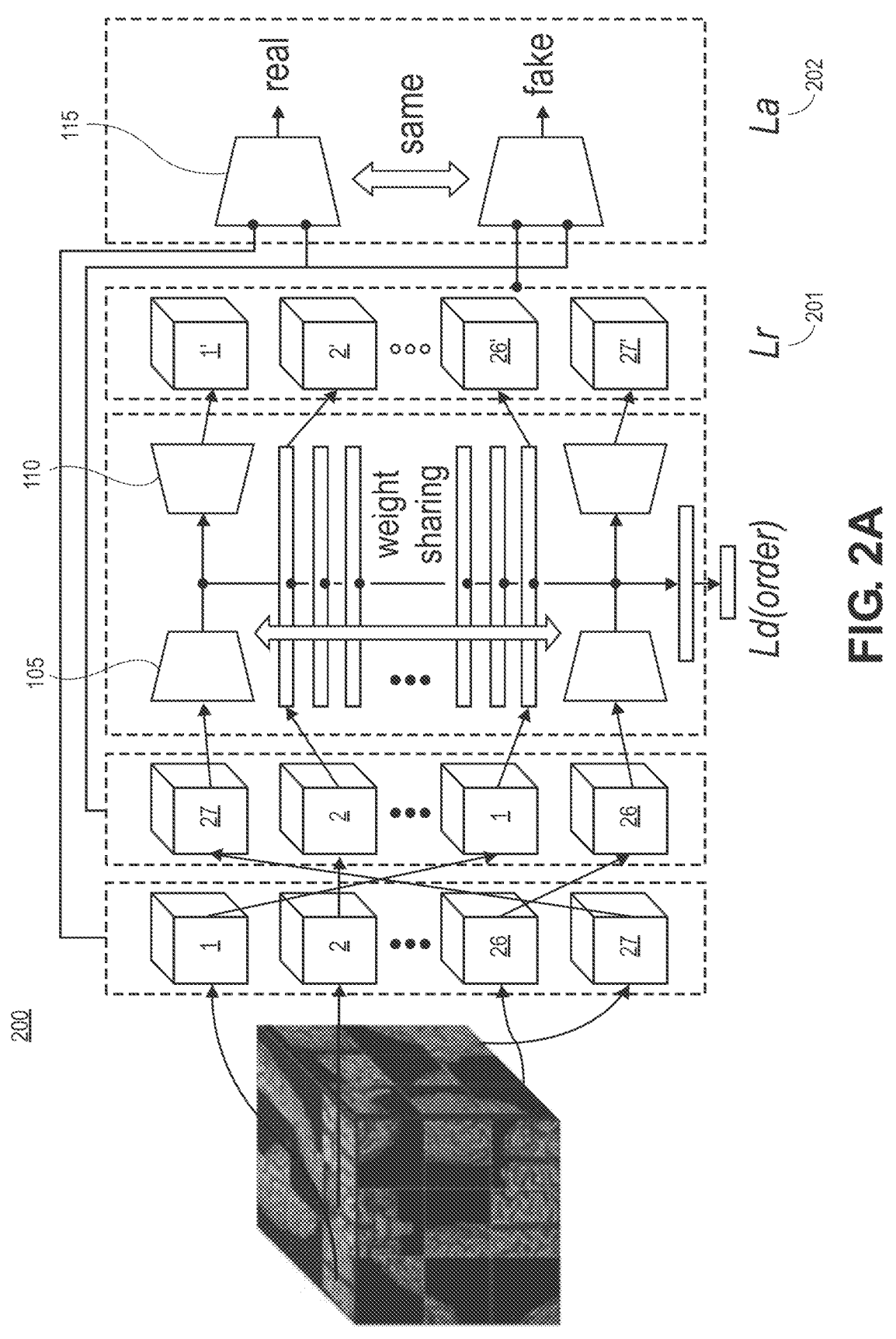
FIGS. 2A, 2B, 2C, 2D, and 2E depict a novel "United framework" in greater detail having specially re-designed SSL techniques integrated therein, in accordance with described embodiments.
Figure 2B:
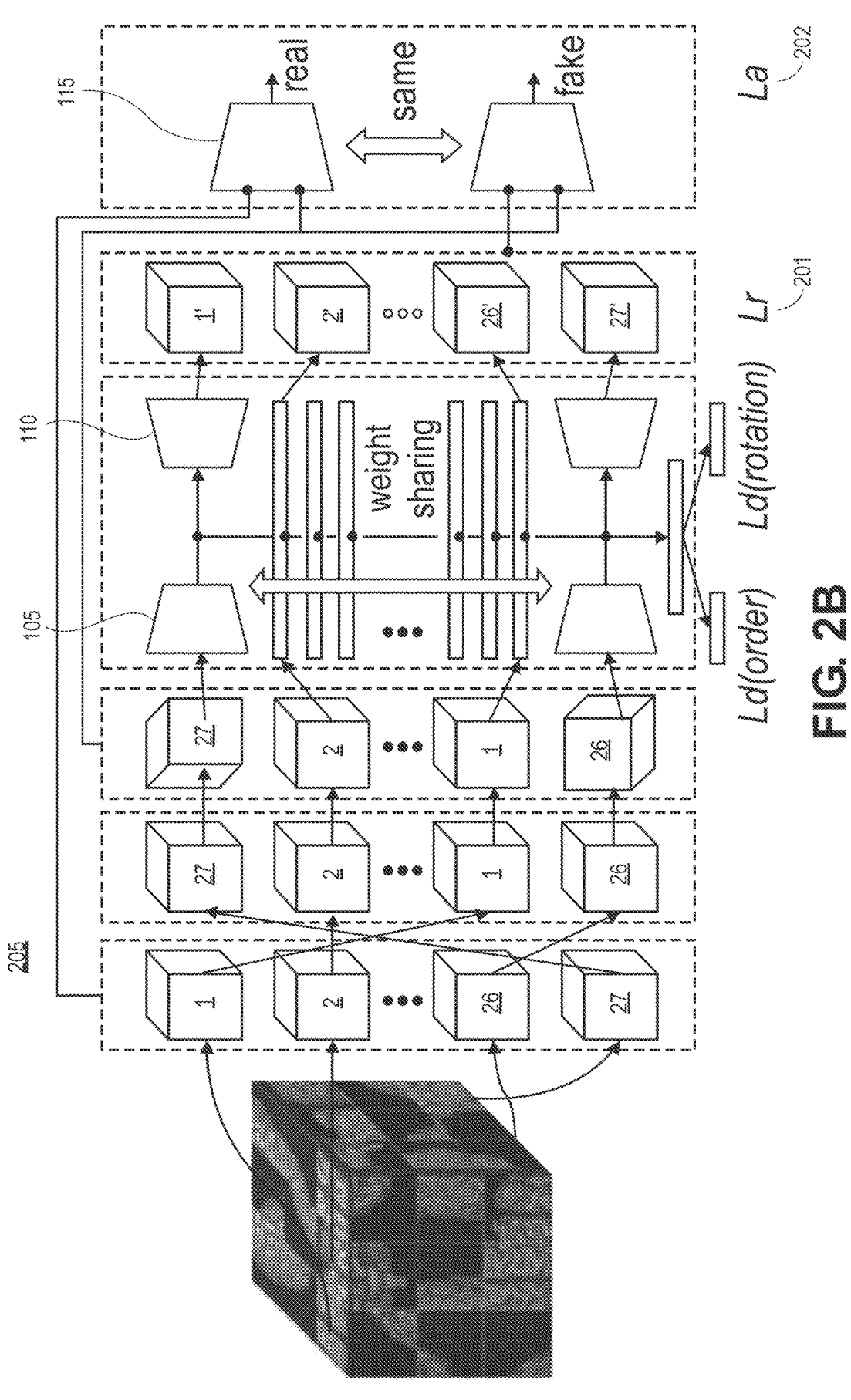
Figure 2C:
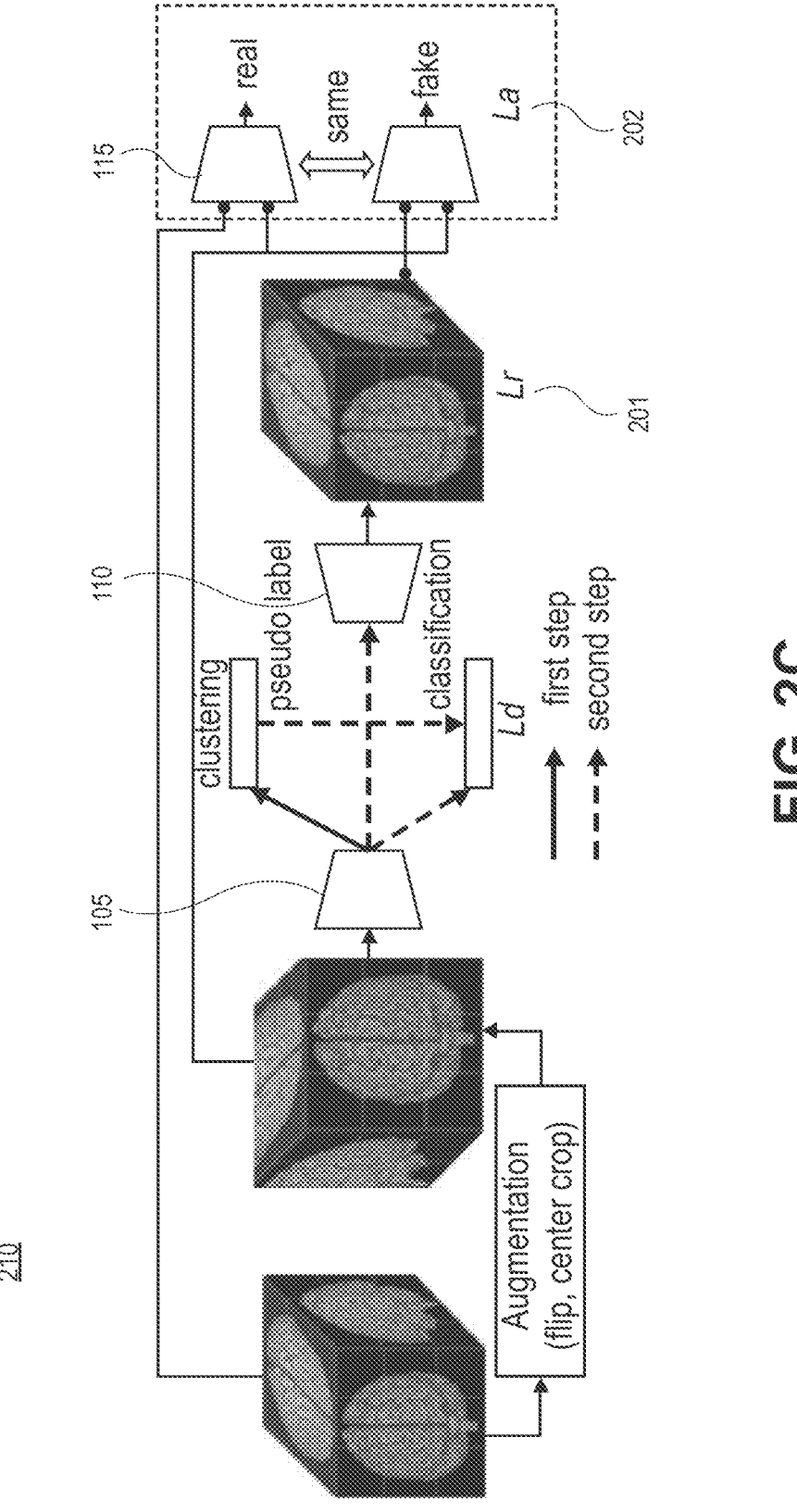
Figure 2D:
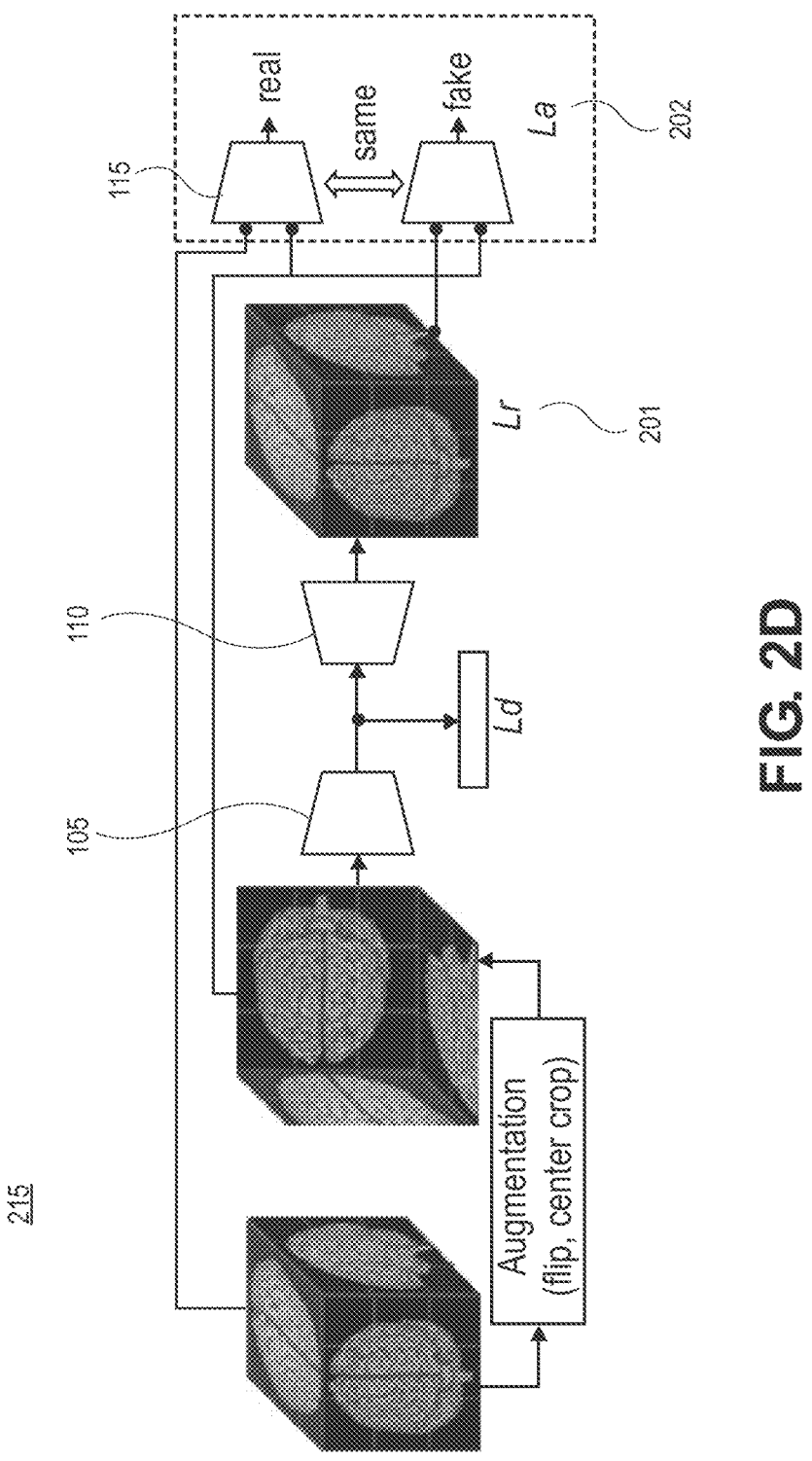
Figure 2E:
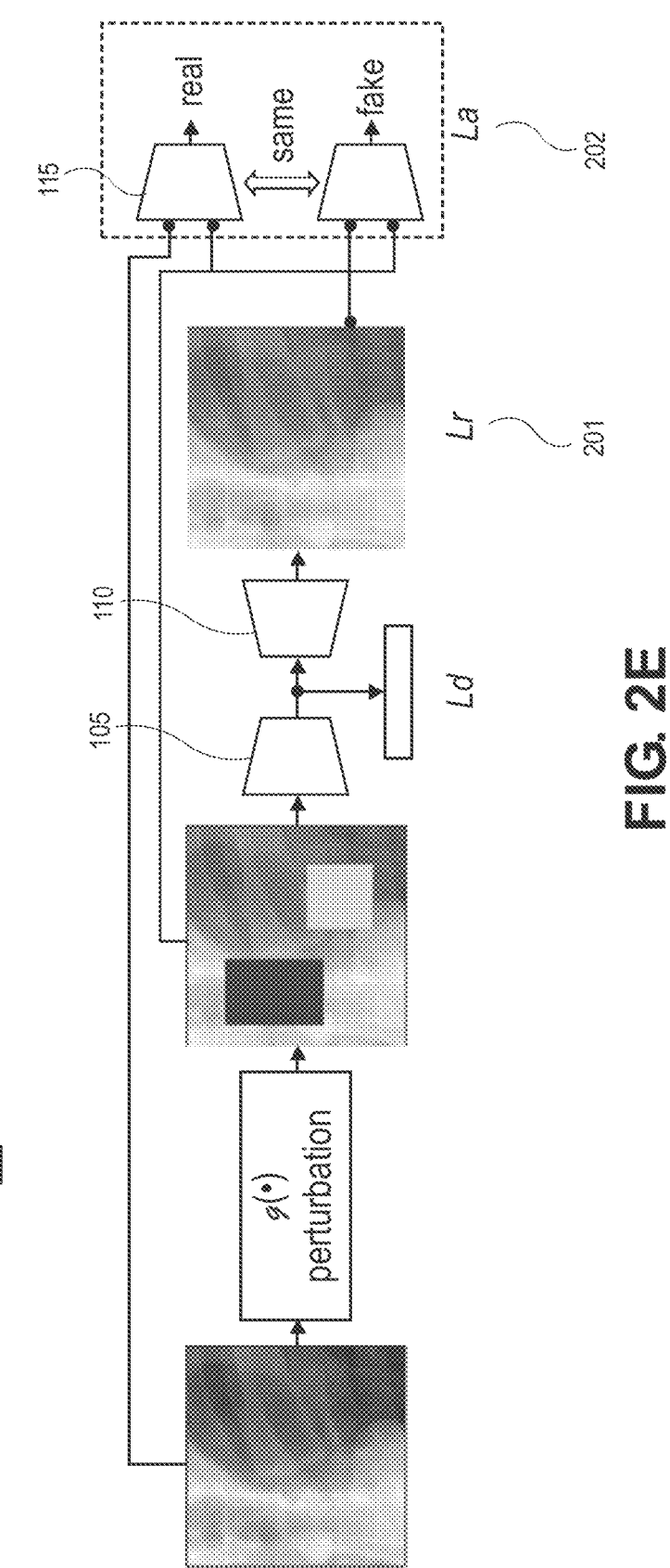

As is depicted here, five prominent SSL methods are redesigned and integrated into the depicted United Framework, specifically to include each of: a Jigsaw method 200 as depicted by FIG. 2A, a Rubik's Cube method 205 as depicted by FIG. 2B, a Deep Clustering method 210 as depicted by FIG. 2C, a Rotation method 215 as depicted by FIG. 2D, and a TransVW method 220 as depicted by FIG. 2E.

The original Jigsaw, Deep Clustering, and Rotation techniques are proposed for 2D image analysis employing discriminative learning alone and provide only pre-trained encoders; therefore, with respect to the United framework illustrated in FIGS. 2A, 2B and 2C, these methods have been augmented with two new components for restorative learning (Lr 201) and adversarial learning (La 202) and then re-implemented in 3D. The Rubik's Cube technique is re-implemented within the new United framework and further augmented with new learning ingredients as depicted. The original TransVW is also integrated within the United framework and then further supplemented with adversarial learning capabilities.

Following the customization and redesign, all five SSL methods provide all three learned components: discriminative encoders 105, restorative decoders 110, and adversarial encoders 115, which are transferable to target classification and segmentation tasks.

Pre-training the United models (e.g., pre-training all three components together) directly from scratch is unstable; therefore, various training strategies were investigated and a stable solution is used. Specifically, the use of stepwise incremental pre-training.

An example of such pre-training is as follows: first training a discriminative encoder 105 via discriminative learning (Step D in FIG. 1), then attaching the pre-trained discriminative encoder 105 to a restorative decoder 110 (i.e., forming an encoder-decoder 120) for further combined discriminative and restorative learning (Step (D)+R in FIG. 1), and finally associating the pre-trained auto-encoder 120 with an adversarial encoder 115 for the final full discriminative, restorative, and adversarial training (Step ((D)+R)+A in FIG. 1).

This stepwise pre-training strategy provides the most reliable performance across most target tasks evaluated in this work encompassing both classification and segmentation (refer to each of Tables 2, 3, and 4 discussed below).

Figure 6:
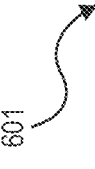
FIG. 6 depicts Table 2 which shows how discriminative learning alone or combined with incremental restorative learning enhances discriminative encoders for classification tasks, in accordance with described embodiments.

Through extensive experimentation, it was observed that (1) discriminative learning alone (e.g., Step D) significantly enhances discriminative encoders 105 on target classification tasks (e.g., +3% and +4% Area Under the ROC Curve (AUC) improvement for lung nodule and pulmonary embolism false positive reduction as shown in Table 2 as set forth in FIG. 6) relative to training from scratch; (2) in comparison with (sole) discriminative learning, incremental restorative pre-training combined with continual discriminative learning (e.g., Step (D)+R) enhances discriminative encoders further for target classification tasks (e.g., +2% and +4% AUC improvement for lung nodule and pulmonary embolism false positive reduction as shown in Table 2) and boosts encoder-decoder models for target segmentation tasks (e.g., +3%, +7%, and +5% Intersection over Union (IoU) improvement for lung nodule, liver, and brain tumor segmentation as shown in Table 3 as set forth in FIG. 7); and (3) compared with Step (D)+R, the final stepwise incremental pre-training (e.g., Step: ((D)+R)+A) generates sharper and more realistic medical images (e.g., Frechet Inception Distance (FID)) decreases from 427.6 to 251.3 as shown in Table 5 (as set forth at FIG. 9) and further strengthens each component for representation learning, leading to considerable performance gains (see FIGS. 3A, 3B, and 3C below) and annotation cost reduction (e.g., 28%, 43%, and 26% faster) for lung nodule false positive reduction, lung nodule tumor segmentation, and pulmonary embolism false positive reduction as seen in FIGS. 4A, 4B, and 4C below) for five target tasks across diseases, organs, datasets, and modalities.

Figure 3A:
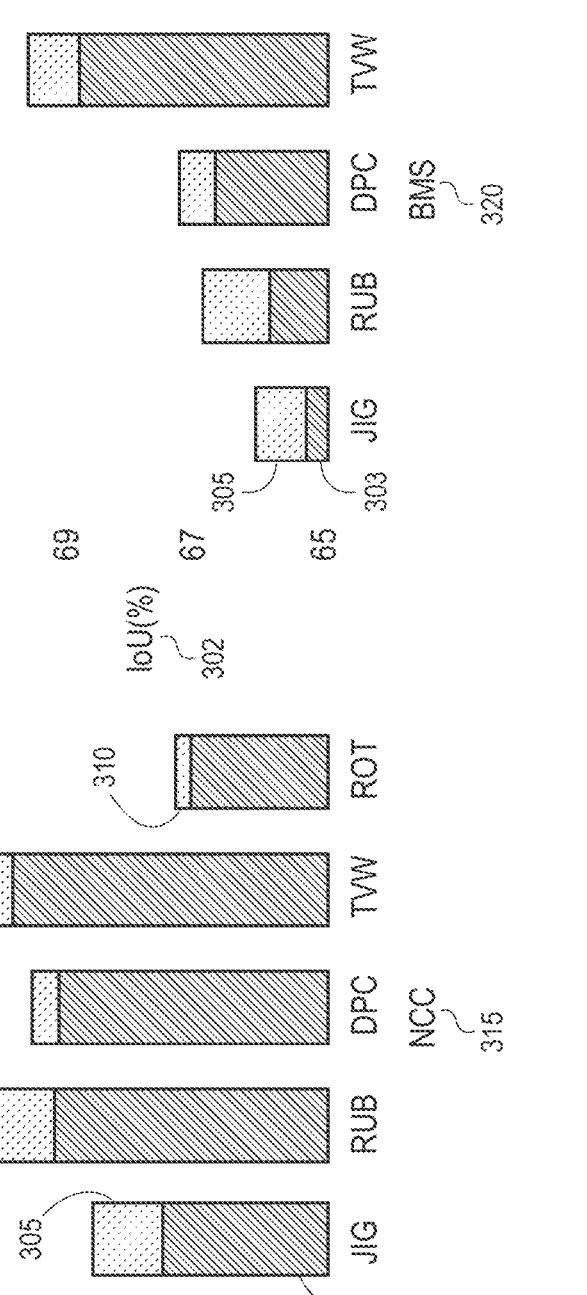
FIGS. 3A, 3B, and 3C depict adversarial training methodologies for strengthening learned representation, in accordance with described embodiments.
Figure 3B:
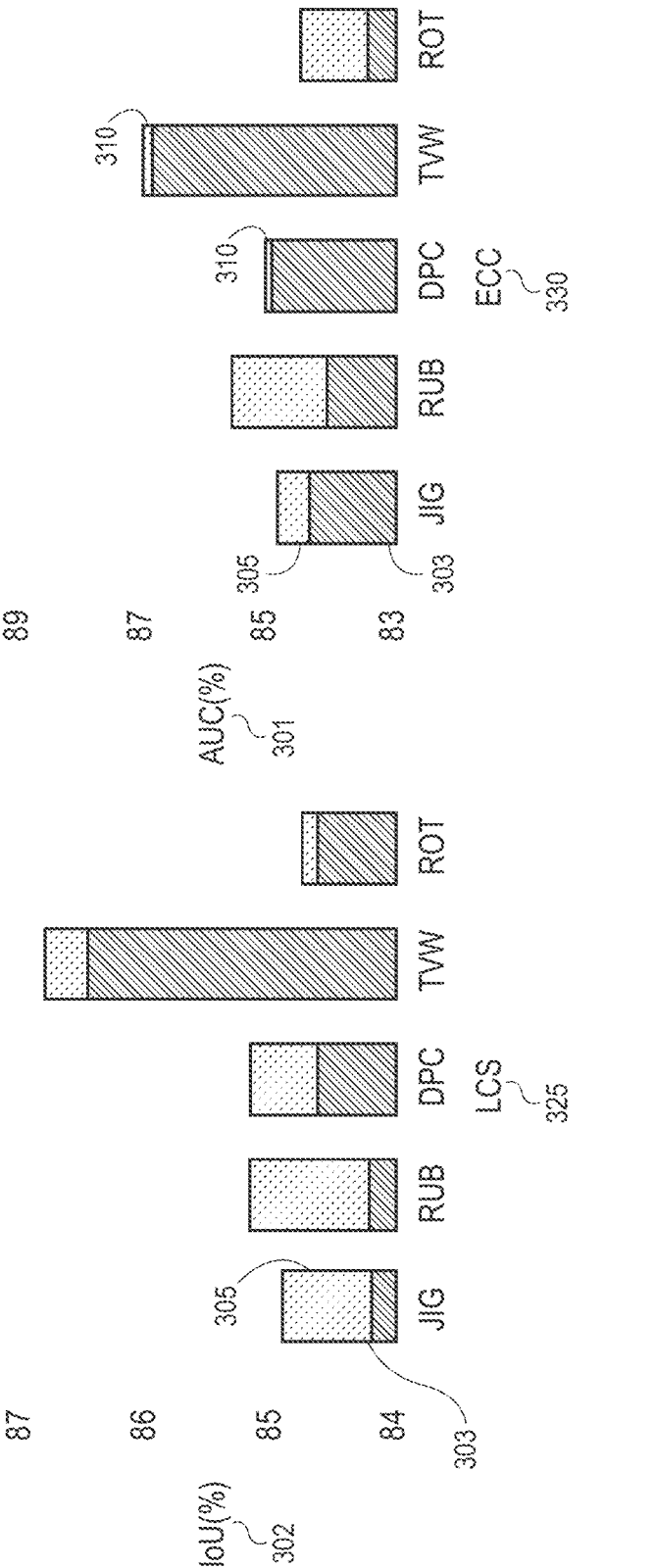
Figure 3C:
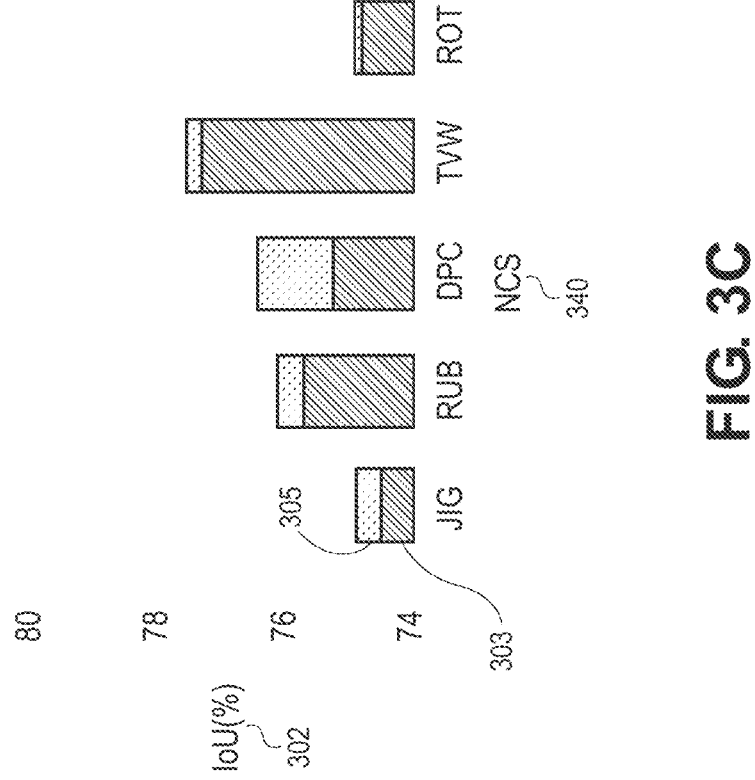

FIGS. 3A, 3B, and 3C depict adversarial training methodologies for strengthening learned representation, in accordance with described embodiments, in which JIG refers to Jigsaw, RUB refers to Rubik's Cube, DPC refers to Deep-Cluster, TVW refers to TransVW, and ROT refers to Rotation.

More specifically, as shown in FIGS. 3A, 3B and 3C, target task performance is generally increased above a baseline performance 303 (see performance gain after adversarial learning shown at 305) following the adversarial training. Although some target tasks show a decrease (see performance loss after adversarial learning shown at 310), the reductions do not reach statistical significance according to the t-test.

Figure 4A:
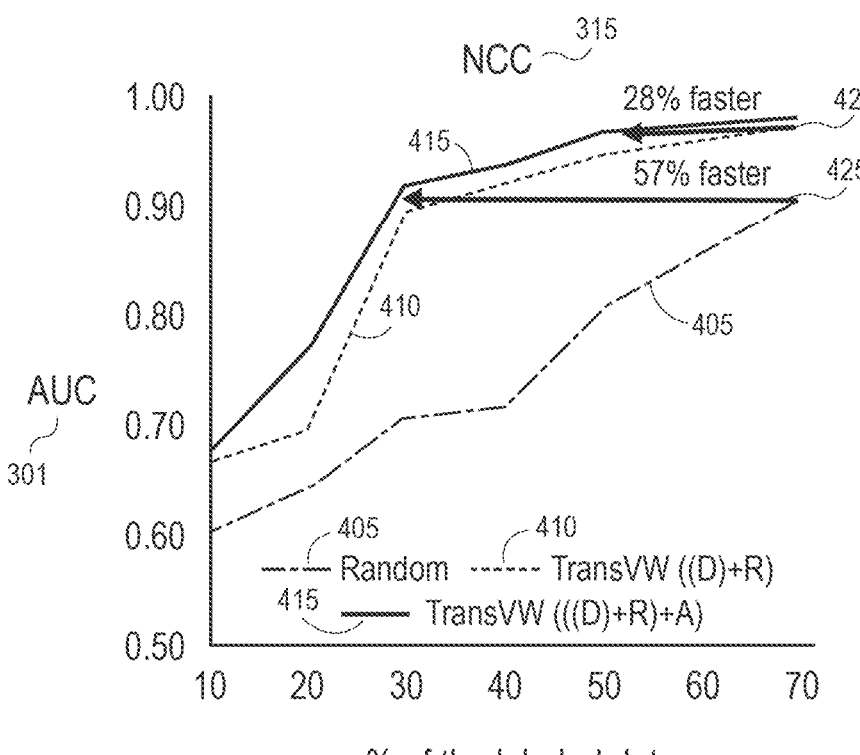
FIGS. 4A, 4B, and 4C depict adversarial training methodologies for reducing annotation costs, in accordance with described embodiments.
Figure 4B:
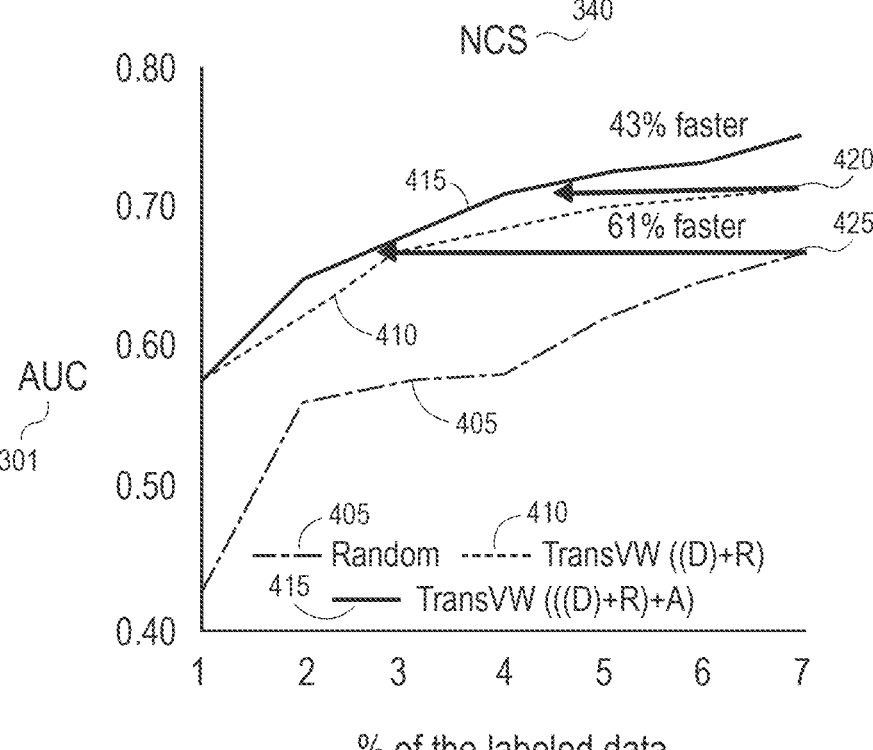
Figure 4C:
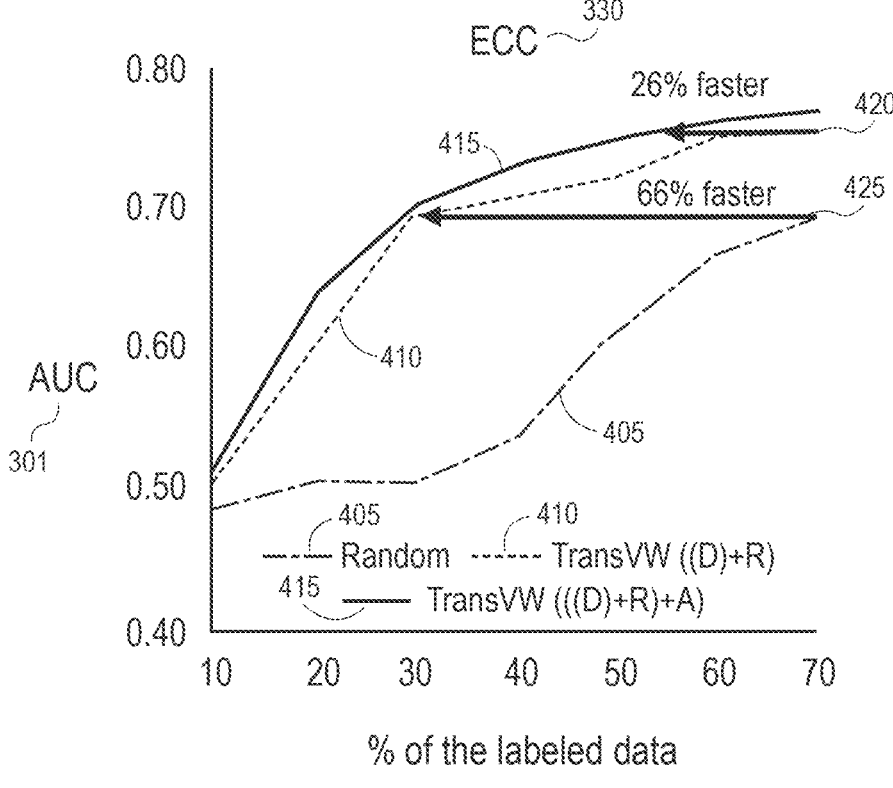

FIGS. 4A, 4B, and 4C depict adversarial training methodologies for reducing annotation costs, in accordance with described embodiments.

More specifically, as shown in FIGS. 4A, 4B and 4C, TransVW combined with adversarial learning reduces the annotation cost by 28%, 43%, and 26% for target tasks of NCC, NCS, and ECC, respectively, as depicted at 420, compared with the original TransVW 410. It also reduces the annotation cost by 57%, 61%, and 66% for target tasks of NCC, NCS, and ECC, respectively, as depicted at 425, compared with initializing the network from random at 405.

Figure 5:
FIG. 5 depicts Table 1 which shows how the ((D)+R)+A strategy always outperforms the D+R+A strategy on all five target tasks, in accordance with described embodiments.

FIG. 5 depicts Table 1 (element 501) which shows how the ((D)+R)+A strategy always outperforms the D+R+A strategy on all five target tasks, in accordance with described embodiments. The mean and standard deviation is reported across ten runs and independent two sample t-tests were performed between the two strategies. The text in the table is in boldface type font when the results are significantly different at the $p=0.05$ level.

FIG. 6 depicts Table 2 (element 601) which shows how discriminative learning alone or combined with incremental restorative learning enhances discriminative encoders for classification tasks, in accordance with described embodiments. The mean and standard deviation (mean±s.d.) is reported across ten trials, along with the statistical analysis (*$p<0.5$, $p<0.1$, *$p<0.05$) with and without incremental restorative pre-training for five self-supervised learning methods. In the "Decoder" column, the terms " ✗" and "✓" denote a non-pre-trained decoder and with pre-trained decoders but not used for target tasks. With incremental restorative learning, the performance gains were consistent for both target tasks.

FIG. 7 depicts Table 3 (element 701) which shows how incremental restorative learning ((D)+R) directly boosts target segmentation tasks, in accordance with described embodiments. In the "Decoder" column, the terms " ✗" and "✓" denote a non-pre-trained decoder, not using pre-trained decoders, and using pre-trained decoders, respectively. Statistical analysis (*$p<0.5$, $p<0.1$, *$p<0.05$) was conducted between " ✗" and "✓".

Different from prior techniques for combining discriminative, restorative, and adversarial learning, the methodologies and findings set forth herein further customize, extend, and complement such approaches, and, more importantly, significantly differ from such prior attempts which were primarily concerned with contrastive learning (e.g., through the use of MoCo-v2, Barlow Twins, and SimSiam techniques) and thus focused on 2D medical image analysis.

Conversely, the embodiments and techniques described herein focus on 3D medical imaging by purposefully redesigning the five popular SSL methods far beyond contrastive learning, resulting in significant specialization and customization which is not provided by prior known techniques or even contemplated by such prior approaches.

Extending well beyond TransVW methodologies augmented with an adversarial encoder, the stepwise incremental pre-training techniques described herein operate to stabilize the United model training, and in so doing, reveal new insights into synergistic effects and contributions among the three learning ingredients.

Thus, the novel techniques and described embodiments make at least the following three main contributions: (1) A stepwise incremental pre-training strategy that stabilizes United models' pre-training and unleashes the synergistic effects of the three SSL ingredients; (2) a collection of pre-trained United models that integrate discriminative, restorative, and adversarial learning in a single framework for 3D medical imaging, encompassing both classification and segmentation tasks; and (3) a set of extensive experiments that demonstrate how various pre-training strategies benefit target tasks across diseases, organs, datasets, and modalities.

Stepwise Incremental Pre-Training:

The redesigned five prominent SSL methods include Rotation, Jigsaw, Rubik's Cube, Deep Clustering, and TransVW methods, each of which are then further augmented with the missing components and capabilities provided by prior techniques by combining the redesigned techniques and missing capabilities under the "United framework" as described herein (refer again to FIGS. 2A-2E above).

The United model (FIG. 1) is a skip-connected encoder-decoder 120 associated with an adversarial encoder 115. With the redesign described herein, for the first time, all five methods have all three SSL components. The United models are incrementally trained, component by component, in a stepwise manner, thus yielding three learned transferable components: discriminative encoders 105, restorative decoders 110, and adversarial encoders 115. The pre-trained discriminative encoder 105 can be fine-tuned for target classification tasks: the pre-trained discriminative encoder and restorative decoder, forming a skip-connected encoder-decoder 120 network (i.e., U-Net), can be fine-tuned for target segmentation tasks.

Discriminative learning: Specialized application of discriminative learning is then utilized to train a discriminative encoder $D_\theta$, where $\theta$ represents the model parameters, to predict target label $y \in Y$ from input $x \in X$ by minimizing a loss function for $\forall x \in X$, defined by equation (1) below, as follows:

$$\mathcal{L}_d = -\sum_{n=1}^{N}\sum_{k=1}^{K} y_{nk}\ln(p_{nk}),$$

where N is the number of samples, K is the number of classes, and $P_{nk}$ is the probability predicted by $D_\theta$ for $x_n$ belonging to Class k; that is to say, $P_n = D_\theta(x_n)$ is the probability distribution predicted by $D_\theta$ for $x_n$ over all classes.

Restorative learning: Specialized application of restorative learning is then utilized to train an encoder-decoder $(D_\theta, R_{\theta'})$ to reconstruct an original image "x" from its distorted version "T(x)", where "T" is a distortion function, by minimizing pixel-level reconstruction error according to equation (2) below, as follows:

$$\mathcal{L}_r = \mathbb{E}_x L_2(x, R_{\theta'}(D_\theta(\mathcal{T}(x)))),$$

where $L_2(u,v)$ is the sum of squared pixel-by-pixel differences between u and v.

Adversarial learning: Specialized application of adversarial learning is then utilized to train an additional adversarial encoder, "$A_{\theta''}$", to help the encoder-decoder $(D_\theta, R_{\theta'})$ reconstruct more realistic medical images and in turn strengthen representation learning. The adversarial encoder learns to distinguish fake image pair "$(R_{\theta'}(D_\theta(T(x))), T(x))$" from real pair "(x, T(x))" via an adversarial loss according to equation (3) below, as follows:

$$\mathcal{L}_a = E_{x,T(x)}\log A_{\theta''}(\mathcal{T}(x),x) + E_x \log(1 - A_{\theta''}(\mathcal{T}(x),R_{\theta'}(D_\theta(T(\mathcal{T}(x)))).$$

The final objective: Specialized application of equation (4) is then utilized to combine all losses. Equation (4) is set forth below, as follows:

$$L = \lambda_d L_d + \lambda_r L_r + \lambda_a L_a,$$

where "$\lambda_d$", "$\lambda_r$", and "$\lambda_a$" control the importance of each of the learning ingredients.

Stepwise incremental pre-training: Specialized application stepwise incremental pre-training is then utilized for training the United models continually, component-by-component, because training a whole or the entirety of the United model in an end-to-end fashion (e.g., all three components together directly from scratch, which is a strategy called (D+R+A)) has proven to be unstable. For example, as shown in Table 1 (see FIG. 5), the strategy ((D)+R)+A) (refer again to FIG. 1 above) has been shown to always outperform the Strategy (D+R+A) and provides for the most reliable performance across most target tasks evaluated.

Experiments and Results:

Datasets and Metrics: To pre-train all five United models, 623 CT scans were utilized from the LUNA16 dataset. Sub-volumes were cropped from the samples with a pixel size of 64×64×64.

The effectiveness of pre-training the five methods was then evaluated by testing their performance on five 3D medical imaging tasks including BraTS, LUNA16, LiTS, PE-CAD, and LIDC-IDRI. With reference to FIGS. 3A, 3B, 3C, acronyms BMS 320, LCS 325, and NCS 340 denote the tasks of segmenting a brain tumor, liver, and lung nodules respectively. The acronyms NCC 315 and ECC 330 denote the tasks of reducing lung nodule and pulmonary embolism false positives results, respectively.

Performances of the pre-trained models were measured on five target tasks and the AUC 301 (Area Under the ROC Curve) was reported for classification tasks and IoU 302 (Intersection over Union) was reported for segmentation tasks.

All target tasks ran at least 10 times and statistical analysis was performed using independent two-sample t-test.

For a first experiment, (1) Incremental restorative learning ((D)+R) was shown to enhance discriminative encoders further for classification tasks. After pre-training discriminative encoders, restorative decoders were appended to the end of the encoders and processing then continued to pre-train the discriminative encoder and restorative decoder together. The incremental restorative learning was shown to significantly enhance encoders in classification tasks, as shown in Table 2 as set forth at FIG. 6. Specifically, compared with the original methods, the incremental restorative learning improves Jigsaw by AUC scores of 1.9% and 2.6% in NCC and ECC, and similarly, improves Rubik's Cube by 1.9% and 2.4%, Deep Clustering by 0.9% and 0.3%, TransVW by 1.0% and 2.9%, and Rotation by 1.0% and 1.2%.

The discriminative encoders are enhanced because they not only learn global features for discriminative tasks but also learn fine-grained features through incremental restorative learning.

For a second experiment, (2) incremental restorative learning ((D)+R) directly boosted target segmentation tasks. The most state-of-the-art prior known segmentation methods do not pre-train their decoders but instead initialize them at random. Unfortunately, the random decoders are suboptimal, as is evidenced by the data in Table 3 as set forth at FIG. 7. The results demonstrate that the incremental pre-trained restorative decoders can directly boost target segmentation tasks. In particular, compared with the prior known methods, the incremental pre-trained restorative decoder improves Jigsaw by 1.2%, 2.1% and 2.0% IoU improvement in NCS 340, LCS 325 and BMS 320 and similarly improves Rubik's Cube by 2.8%, 7.6%, and 3.1%, Deep Clustering by 1.1%, 2.0%, and 0.9%, TransVW by 0.4%, 1.4%, and 4.8% and Rotation by 0.6%, 2.2% and 1.5%.

The consistent performance gain suggests that a wide variety of target segmentation tasks can benefit from the use of the incremental pre-trained restorative decoders as described herein.

For a third experiment, (3) adversarial training strengthened representation and reduced annotation costs. Quantitative measurements shown in Table 5 (as set forth at FIG. 9 below) reveal that adversarial training can generate sharper and more realistic images in the restoration proxy task. More importantly, it was found that adversarial training also makes a significant contribution to pre-training. First, as shown in FIGS. 3A, 3B, and 3C, adding adversarial training can benefit most target tasks, particularly segmentation tasks. The incremental adversarial pre-training improves Jigsaw by AUC scores of 0.3%, 0.7%, and 0.7% in NCS 340, LCS 325, and BMS 320 and similarly improves Rubik's Cube by 0.4%, 1.0%, and 1.0%, Deep Clustering by 0.5%, 0.5%, and 0.5%, TransVW by 0.2%, 0.3%, and 0.8% and Rotation by 0.1%, 0.1%, and 0.7%. Additionally, incremental adversarial pre-training improves performance on small data regimes.

Still further, FIGS. 4A, 4B, and 4C show that incremental adversarial pre-trained TransVW can reduce the annotation cost by 28%, 43%, and 26% on NCC, NCS, and ECC, respectively, compared with prior known TransVW techniques.

FIG. 8 depicts Table 4 (element 801) which shows a comparison amongst different training strategies, in accordance with described embodiments. The mean and standard deviation (mean±s.d.) is reported across ten trials along with statistical analysis ($*p<0.5$, $p<0.1$, $*p<0.05$) between the best (highest mean value) and the worst (lowest mean value) training strategies among similar setups (e.g., same number of components and training steps) for Jigsaw and Deep Clustering, respectively.

Figure 9:
FIG. 9 depicts Table 5 which shows how adversarial training generates sharper and realistic images for restoration tasks, in accordance with described embodiments.
Figures 10A, 10B:
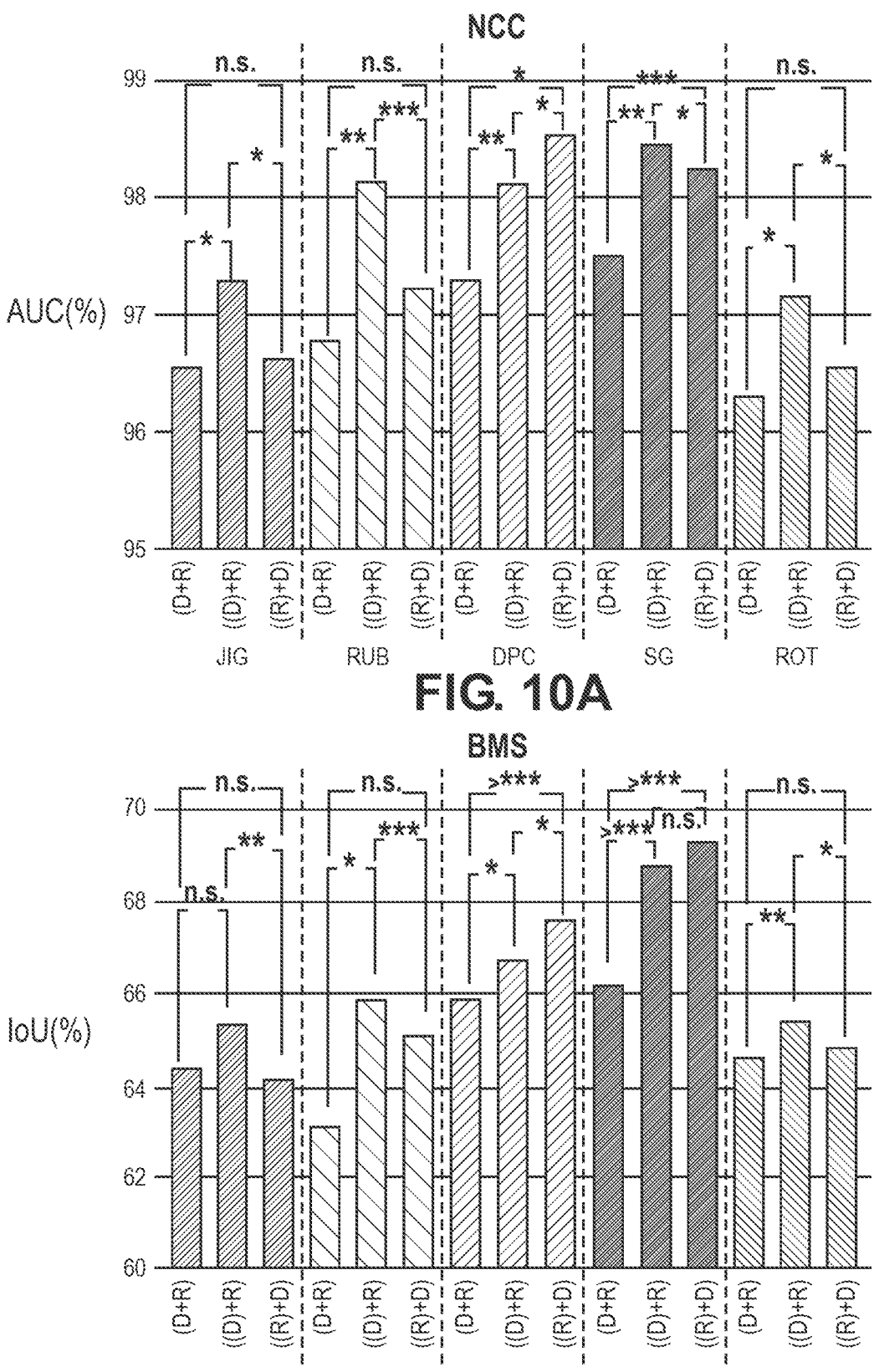
FIGS. 10A, 10B, 10C, 10D, and 10E depict a comparison of different variants of the stepwise pre-training scheme ((R)+D) and ((D)+R) with components D and R, in accordance with described embodiments.
Figures 10C, 10D:
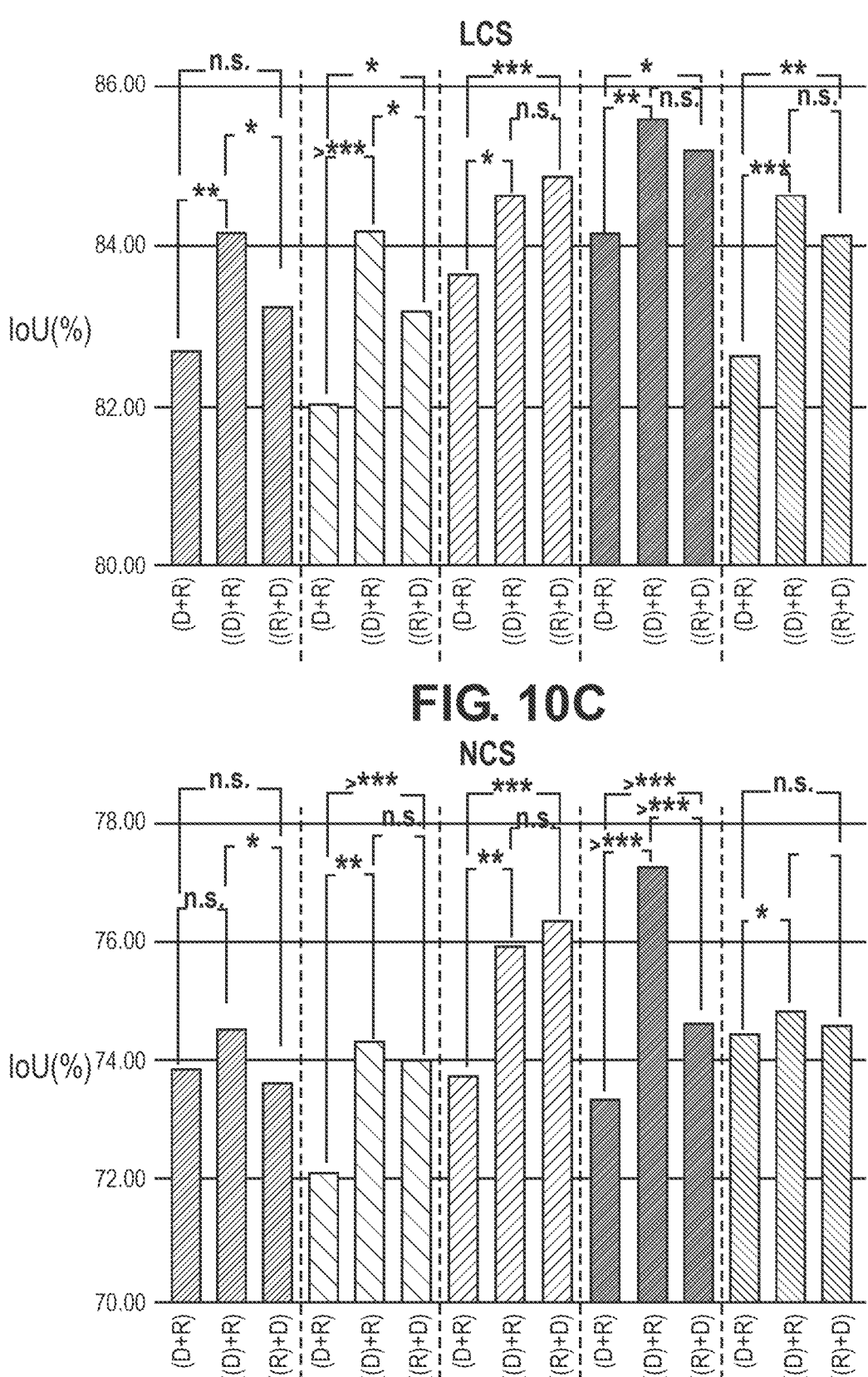
Figure 10E:
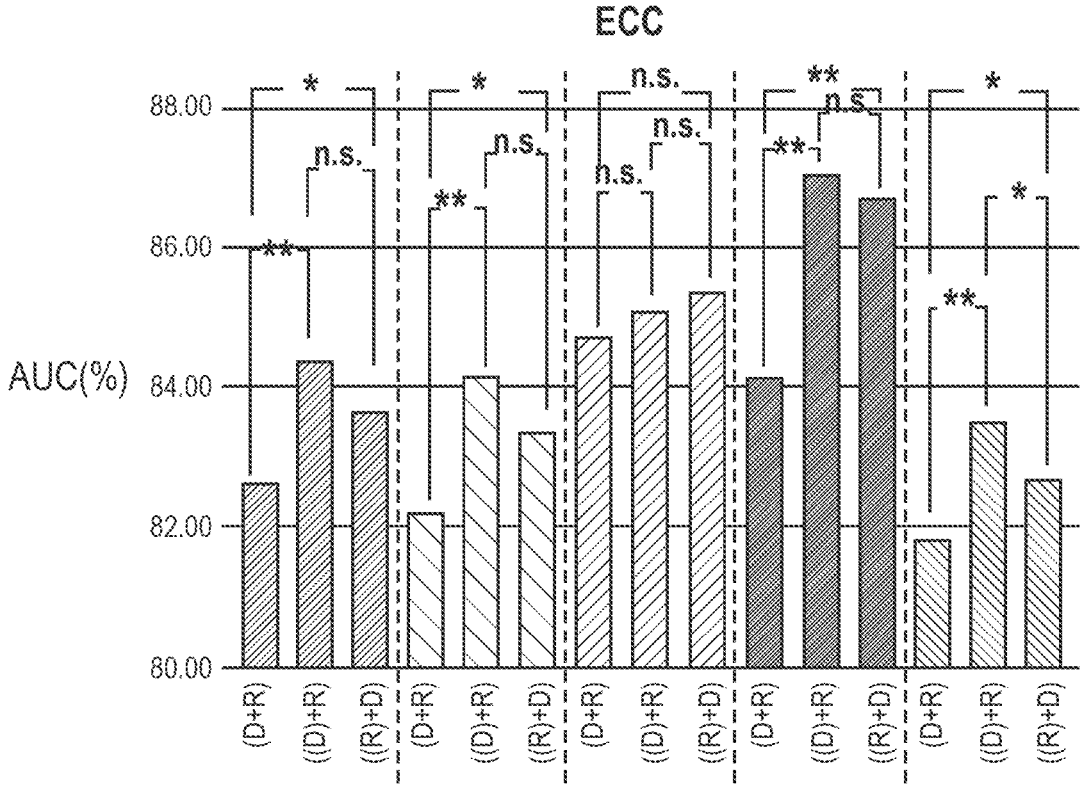

FIG. 9 depicts Table 5 (element 901) which shows how adversarial training generates sharper and realistic images for restoration tasks, in accordance with described embodiments. As depicted therein, subsequent to adversarial training, the Mean Square Error (MSE) and Frechet Inception Distance (FID) scores for each of the five approaches all declined, suggesting that the distribution of the produced images had moved closer to the original one. The Multi-Scale Structural Similarity for Image Quality (MS-SSIM) score increased after the adversarial training, indicating the generated images were structurally similar to the original one.

Five Prominent SSL Methods for 3D Medical Imaging Redesigned and Augmented:

According to the described embodiments, the 3D U-Net model is adopted as the backbone for all five methods for feature extraction and image restoration. Jigsaw and Rubik's Cube employ Siamese 3D U-Net (27 branches) to process the sub-cubes of a whole input image, whereas Deep Clustering, Rotation, and TransVW use the original 3D U-Net. The output from the 3D U-Net bottleneck layer is used and attached to fully-connected layers for the discrimination task of the five methods.

Adversarial encoders are also used in all methods. If the input is the pair of the original image and the corresponding transformed version (e.g., through augmentation (Rotation, Deep Clustering, TransVW), order permutation (Jigsaw, Rubik's Cube), and rotation (Rubik's Cube, Deep Clustering)), the output is real. If the input is the pair of the reconstructed image and the transformed original image, the output is fake. Note that the restoration process always attempts to reconstruct the original image, not the transformed version. In experiments, the controls $\lambda_d$, $\lambda_r$, and $\lambda_a$ were set to $=100$ to balance the losses.

Jigsaw: The 3D Jigsaw methodology is specially adapted and extended from the original Jigsaw used for 2D into 3D as illustrated at FIG. 2A above. The modified 3D jigsaw technique first divides an input image into a 3×3×3 grid of 3D patches and shuffles the patches according to a pre-defined permutation. To limit the number of classes, a total of 1000 permutations are selected from all possible combinations using a Hamming Distance-based algorithm. Each permutation is treated as a class, and the Jigsaw puzzle is thus formulated as a classification task in which the model is trained to recognize the permutation ID.

Rubik's Cube: Similar to the jigsaw puzzle pretext task, the Rubik's Cube technique predicts the relative position of sub-cubes in pretext training, as illustrated at FIG. 2B above. It can be seen as the 3D extension of the jigsaw puzzle and inherently utilizes the 3D volumetric medical image data. It is also a multitask system. Not only does it predict the relative position of the sub-cubes but Rubik's Cube also judges if each cube had been rotated. This method is another example of the discriminative method as both pretext tasks are classification problems.

Deep Clustering: Deep clustering is the specially configured and extended variant of traditional clustering methods applied in neural networks. It jointly learns the parameters of the neural network and the cluster assignment of the extracted features. The method can be viewed as a discriminative method as it learns the parameters through classification tasks. There is also a family of clustering methods that incorporate generative models. Because features learned by the discriminator part of prior known models are not adequate, the method is modified and specially configured to be applied to the medical domain for 3D applications by altering the CNN architecture as illustrated in FIG. 2C above.

Rotation: Application of the Rotation technique is utilized to teach a CNN to distinguish the rotation angle of an image. Four possible angles are defined, including: 0 degrees, 90 degrees, 180 degrees, and 270 degrees. The network takes an input image and classifies its rotation angle into one of the four classes. Using a specially configured 3D implementation of the rotation technique, restorative learning and adversarial learning is added via customized extensions, as illustrated at FIG. 2D above.

TransVW: Application of a TransVW methodology employs an encoder-decoder architecture with skip connections and a classification head attached to the encoder. The framework uses the self-discovered (clustering) visual words as the supervision signal. Then, through self-classification, the model is trained to classify each of the visual words. TransVW is similar to deep clustering, but rather than using the entire image to form clusters, the self-discovering process only considers the patches extracted from the same coordinate across the similar images, as illustrated at FIG. 2E above.

FIGS. 10A, 10B, 10C, 10D, and 10E depict a comparison of different variants of the stepwise pre-training scheme ((R)+D) and ((D)+R) with components D and R, in accordance with described embodiments, in which JIG refers to Jigsaw, RUB refers to Rubik's Cube, DPC refers to Deep-Cluster, SG refers to Semantic Genesis, and ROT refers to Rotation, and in which n.s. refers to no significance, where "*" indicates $p<0.05$; "" indicates $p<0.01$; "*" indicates $p<0.0001$; and ">*" indicates $p<0.00001$. In comparison to the end-to-end training scheme (D+R), ((R)+D) increases the target task performance the majority of the time. The only two performance decreases are for Jigsaw on BMS 320 and NCS 340** but are not significant according to the t-test. ((D)+R) improves the performance on all five target tasks compared to (D+R). Further still, four out of five methods, ((D)+R) has better performance on all five target tasks compared to ((R)+D). The only exception is for the Deep Clustering where ((R)+D) always performs better than ((D)+ R). This is because for Deep Clustering, training the reconstruction (R) first helps to initialize the clusters, yielding better overall performance.

Five Target Tasks Utilized in Evaluating the Pre-Trained United Models:

Lung nodule false positive reduction (NCC): The dataset from LUNA16 which consists of 888 CT scans with slice thickness less than 2.5 mm is utilized. With 445, 265, and 178 instances each, the dataset is subdivided into training, validation, and testing sets. The initial data are made available for segmenting lung nodules, and additional annotation is made available for the task of reducing false-positive results.

Experimental results are evaluated the performance using Area Under the Curve (AUC) 301 score for classifying true positives and false positive results.

Lung nodule segmentation (NCS): The dataset made available by the Lung Image Database Consortium image collection (LIDC-IDRI) with 1088 cases consisting of lung CT scans with masked nodule locations is utilized. The training set contains 510 cases, the validation set 100 cases, and the testing set 480 cases. To train using this dataset, the CT scans are re-sampled to 1-1-1 spacing and extract cubes with size 64×64×32. Experimental results are evaluated using Intersection over Union (IoU) 302 and Dice coefficient scores to evaluate performance.

Pulmonary embolism false positive reduction (ECC): A database that contains 326 emboli from 121 computed tomography pulmonary angiography (CTPA) images is utilized. Experimental results are evaluated using a proprietary algorithm-based PE candidate generator provided with the database, which yields a total of 687 true positives and 5,568 false positives. The dataset is then split into a training set with 434 true positive PE candidates and 3,406 false positive PE candidates, and a test set with 253 true positive PE candidates and 2,162 false positive PE candidates, both at the patient-level. Candidate level AUC 301 is calculated for distinguishing true and false positive results to facilitate an accurate comparison with the previous study.

Liver segmentation (LCS): A total of 130 labeled CT scans from the MIC-CAI, LiTS Challenge dataset are utilized and divided into subgroups for training (100 patients), validation (15 patients), and testing (15 patients). Two distinct labels, liver and lesion, are provided by the ground truth segmentation. Experimental results are evaluated using Intersection over Union (IoU) 302 and Dice coefficient scores to assess segmentation performance in the studies, only regarding the liver as a positive class and all other classes as negative classes.

Brain tumor segmentation (BMS): The dataset, which comes from the BraTS 2018 challenge, includes 285 patients (210 HGG and 75 LGG), each with four rigorously aligned 3D MRI modalities (T1, T1c, T2, and Flair). Experimental results are evaluated using a 3-fold cross validation method, in which 95 patients comprise the test fold while 190 patients comprise the training fold. Three tumor sub-regions are annotated, including: the necrotic and non-enhancing tumor core (label 1), the GD-enhancing tumor (label 4), and the peritumoral edema (label 2). The background is annotated (label 0). Intersection over Union (IoU) 302 and Dice coefficient scores are again used to assess segmentation performance. Those with label 0 are treated as negatives and all other data as positives.

Stepwise pre-training is essential in stabilizing United models training: Training from scratch is not stable, and therefore, the whole framework is trained from end-to-end (D+R+A) for 300 iterations and the same total number of iterations is used for other training strategies. Experimental results indicate the (D+R+A) strategy is not stable as the loss value of the adversarial training vacillates largely during the training. The results are also poor compared with other training strategies.

Performance of the united framework is further tested with different pre-training orders. These strategies include ((R)+D), (((R)+D)+A), ((R)+A), and (((R)+A)+D). For Jigsaw 200, Rubik's Cube 205, and Rotation 215, the (((D)+R)+A) strategy yields the best performance for downstream tasks. For Deep Clustering 210, (((R)+D)+A) and (((R)+A)+D) outperforms the (((R)+A)+D) strategy alone.

The result is of interest because it is believed that it reflects the positive learning effect that the reconstruction component brings to the clustering process resulting in the generation of sharper and more realistic images.

FIG. 11 depicts each of equation (1), equation (2), equation (3), and equation (4) as utilized in conjunction with the United framework, in accordance with described embodiments.

Definitions

The articles "a" and "an" are used in this disclosure to refer to one or more than one (i.e., to at least one) of the grammatical object of the article. By way of example, "a medical image" means one medical image or more than one medical image.

The term "and/or" is used in this disclosure to mean either "and" or "or" unless indicated otherwise.

ENUMERATED EMBODIMENTS

Embodiment 1: A method comprising:

receiving a medical image;

integrating Self-Supervised machine Learning (SSL) instructions for performing a discriminative learning operation, a restorative learning operation, and an adversarial learning operation into a model for processing a received medical image;

configuring the model with each of a discriminative encoder, a restorative decoder, and an adversarial encoder;

configuring each of the discriminative encoder and the restorative decoder of the model to be skip connected, forming an encoder-decoder for the model;

performing step-wise incremental training to incrementally train each of the discriminative encoder, the restorative decoder, and the adversarial encoder, by performing the following operations:

pre-training the discriminative encoder via discriminative learning;

attaching the pre-trained discriminative encoder to the restorative decoder to configure the encoder-decoder as a pre-trained encoder-decoder of the model;

training the pre-trained encoder-decoder of the model using joint discriminative and restorative learning; and associating the pre-trained encoder-decoder of the model with the adversarial encoder;

performing training of the pre-trained encoder-decoder associated with the adversarial encoder through discriminative, restorative, and adversarial learning to render a trained model for the processing of the received medical image; and processing the medical image through the model using the trained model.

Embodiment 2: The method of embodiment 1, wherein the training of the pre-trained encoder-decoder of the model using joint discriminative and restorative learning comprises:

configuring Self-Supervised machine Learning (SSL) instructions to operate upon three dimensional (3D) medical images;

sampling a 3D volumetric cube from the 3D medical images;

applying a jigsaw solving operation to the sampled 3D volumetric cube;

applying a deep clustering operation to the sampled 3D volumetric cube;

applying a Rubik's Cube operation to the sampled 3D volumetric cube;

applying a Rotation operation to the sampled 3D volumetric cube; and applying a TransVW operation to the sampled 3D volumetric cube.

Embodiment 3: The method of any one of embodiments 1 or 2, wherein configuring the model with each of a discriminative encoder, a restorative decoder, and an adversarial encoder further comprises integrating each of a plurality of Self-Supervised machine Learning (SSL) operations into the model by incorporating instructions into the model for executing each of:

a jigsaw solving operation;

a deep clustering operation;

a Rubik's Cube operation;

a Rotation operation; and a TransVW operation.

Embodiment 4: The method of any one of embodiments 1-3, wherein pre-training the discriminative encoder via discriminative learning comprises:

associating the medical image with computer-generated pseudo labels; and distinguishing the medical image associated with the computer-generated pseudo labels.

Embodiment 5: The method of any one of embodiments 1-4, wherein training the pre-trained encoder-decoder of the model using joint discriminative and restorative learning comprises reconstructing the medical image from distorted variations thereof.

Embodiment 6: The method of any one of embodiments 1-5, wherein associating the pre-trained encoder-decoder of the model with the adversarial encoder comprises:

associating the pre-trained encoder-decoder of the model with the adversarial encoder for discriminative, restorative, and adversarial learning to thereby pre-train the adversarial encoder.

Embodiment 7: A system comprising:

a memory to store instructions;

a processor to execute the instructions stored in the memory;

wherein the system is specially configured to execute instructions via the processor for performing the following operations:

receiving a medical image;

integrating instructions for performing a discriminative learning operation, a restorative learning operation, and an adversarial learning operation into a model for processing a medical image;

configuring the model with each of a discriminative encoder, a restorative decoder, and an adversarial encoder;

configuring each of the discriminative encoder and the restorative decoder of the model to be skip connected, forming an encoder-decoder for the model;

performing step-wise incremental training to incrementally train each of the discriminative encoder, the restorative decoder, and the adversarial encoder, by performing the following operations:

pre-training the discriminative encoder via discriminative learning;

attaching the pre-trained discriminative encoder to the restorative decoder to configure the encoder-decoder as a pre-trained encoder-decoder of the model;

training the pre-trained encoder-decoder of the model using joint discriminative and restorative learning;

associating the pre-trained encoder-decoder of the model with the adversarial encoder;

performing training of the pre-trained encoder-decoder of the model associated with the adversarial encoder through discriminative, restorative, and adversarial learning to render a trained model for the processing of a received medical image; and processing the medical image through the model using the trained model.

Embodiment 8: The system of embodiment 7, wherein the training of the pre-trained encoder-decoder of the model using joint discriminative and restorative learning comprises:

configuring Self-Supervised machine Learning (SSL) instructions to operate upon a three-dimensional (3D) medical image;

sampling a 3D volumetric cube from the 3D medical image;

applying a jigsaw solving operation to the sampled 3D volumetric cube;

applying a deep clustering operation to the sampled 3D volumetric cube;

applying a Rubik's Cube operation to the sampled 3D volumetric cube;

applying a Rotation operation to the sampled 3D volumetric cube; and applying a TransVW operation to the sampled 3D volumetric cube.

Embodiment 9: The system of any one of embodiments 7 or 8, wherein configuring the model further comprises integrating each of a plurality of Self-Supervised Learning (SSL) operations into the model by incorporating instructions into the model for executing each of:

a jigsaw solving operation;

a deep clustering operation;

a Rubik's Cube operation;

a Rotation operation; and a TransVW operation.

Embodiment 10: The system of any one of embodiments 7-9, wherein pre-training the discriminative encoder via discriminative learning comprises:

associating the medical image with computer-generated pseudo labels; and distinguishing the medical image associated with the computer-generated pseudo labels.

Embodiment 11: The system of any one of embodiments 7-10, wherein training the pre-trained encoder-decoder of the model using joint discriminative and restorative learning comprises reconstructing the medical image from distorted variations thereof.

Embodiment 12: The system of any one of embodiments 7-11, wherein associating the pre-trained encoder-decoder of the model with the adversarial encoder comprises associating the pre-trained encoder-decoder of the model with the adversarial encoder for discriminative, restorative, and adversarial learning to thereby pre-train the adversarial encoder.

Embodiment 13: A non-transitory computer readable storage media having instructions stored thereupon that, when executed by a process of a system specially configured for diagnosing disease within new medical images, wherein the instructions cause the system to perform operations including:

receiving a medical image;

integrating Self-Supervised machine Learning (SSL) instructions for performing a discriminative learning operation, a restorative learning operation, and an adversarial learning operation into a model for processing a received medical image;

configuring the model with each of a discriminative encoder, a restorative decoder, and an adversarial encoder;

configuring each of the discriminative encoder and the restorative decoder of the model to be skip connected, forming an encoder-decoder for the model;

performing step-wise incremental training to incrementally train each of the discriminative encoder, the restorative decoder, and the adversarial encoder, by performing the following operations:

pre-training the discriminative encoder via discriminative learning;

attaching the pre-trained discriminative encoder to the restorative decoder to configure the encoder-decoder as a pre-trained encoder-decoder of the model;

training the pre-trained encoder-decoder of the model using joint discriminative and restorative learning;

associating the pre-trained encoder-decoder of the model with the adversarial encoder;

performing training of the pre-trained encoder-decoder associated with the adversarial encoder through discriminative, restorative, and adversarial learning to render a trained model for the processing of the received medical image; and processing the medical image through the model using the trained model.

Embodiment 14: The non-transitory computer readable storage media of embodiment 13, wherein the training of the pre-trained encoder-decoder of the model using joint discriminative and restorative learning comprises:

configuring Self-Supervised machine Learning (SSL) instructions to operate upon a three-dimensional (3D) medical image;

sampling a 3D volumetric cube from the 3D medical image;

applying a jigsaw solving operation to the sampled 3D volumetric cube;

applying a deep clustering operation to the sampled 3D volumetric cube;

applying a Rubik's Cube operation to the sampled 3D volumetric cube;

applying a Rotation operation to the sampled 3D volumetric cube; and applying a TransVW operation to the sampled 3D volumetric cube.

Embodiment 15: The non-transitory computer readable storage media of any one of embodiments 13 or 14, wherein configuring the model with each of a discriminative encoder, a restorative decoder, and an adversarial encoder further comprises integrating each of a plurality of Self-Supervised machine Learning (SSL) operations into the model by incorporating instructions into the model for executing each of:

a jigsaw solving operation;

deep clustering operations;

Rubik's Cube operations;

Rotation operations; and

TransVW operations.

Embodiment 16: The non-transitory computer readable storage media of any one of embodiments 13-15, wherein pre-training the discriminative encoder via discriminative learning comprises:

associating the medical image with a computer-generated pseudo label; and distinguishing the medical image associated with the computer-generated pseudo label.

Embodiment 17: The non-transitory computer readable storage media of any one of embodiments 13-16, wherein training the pre-trained encoder-decoder of the model using joint discriminative and restorative learning comprises reconstructing the medical image from distorted variations thereof.

Embodiment 18: The non-transitory computer readable storage media of any one of embodiments 13-17, wherein associating the pre-trained encoder-decoder of the model with the adversarial encoder comprises associating the pre-trained encoder-decoder of the model with the adversarial encoder for discriminative, restorative, and adversarial learning to thereby pre-train the adversarial encoder.

CONCLUDING REMARKS

It is therefore in accordance with the described embodiments that a specially configured "United framework" is disclosed which integrates discriminative SSL methods with restorative and adversarial learning. Experimental results demonstrate that use of the pre-trained United models consistently outperforms baselines from all prior known techniques. This performance improvement is attributable to the customized implementation of the stepwise pre-training scheme, which not only stabilizes the pre-training but also unleashes the synergy of discriminative, restorative, and adversarial learning. It is therefore understood that pre-trained United models leveraged through use and practice of the disclosed embodiments exert an important impact on medical image analysis across diseases, organs, modalities, and specialties.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims is to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method comprising:

receiving a medical image;

integrating Self-Supervised machine Learning (SSL) instructions for performing a discriminative learning operation, a restorative learning operation, and an adversarial learning operation into a model for processing the received medical image;

configuring the model with each of a discriminative encoder, a restorative decoder, and an adversarial encoder;

configuring each of the discriminative encoder and the restorative decoder of the model to be skip connected, forming an encoder-decoder of the model;

performing step-wise incremental training to incrementally train each of the discriminative encoder, the restorative decoder, and the adversarial encoder, by performing the following operations:

pre-training the discriminative encoder via discriminative learning;

attaching the pre-trained discriminative encoder to the restorative decoder to configure the encoder-decoder as a pre-trained encoder-decoder of the model;

training the pre-trained encoder-decoder of the model using joint discriminative and restorative learning; and associating the pre-trained encoder-decoder of the model with the adversarial encoder;

performing training of the pre-trained encoder-decoder associated with the adversarial encoder through discriminative, restorative, and adversarial learning to render a trained model for the processing of the received medical image; and processing the medical image through the model using the trained model.

2. The method of claim 1, wherein the training of the pre-trained encoder-decoder of the model using joint discriminative and restorative learning comprises:

configuring Self-Supervised machine Learning (SSL) instructions to operate upon three-dimensional (3D) medical images;

sampling a 3D volumetric cube from the 3D medical images;

applying a jigsaw solving operation to the sampled 3D volumetric cubes;

applying a deep clustering operation to the sampled 3D volumetric cubes;

applying a Rubik's Cube operation to the sampled 3D volumetric cubes;

applying a Rotation operation to the sampled 3D volumetric cubes; and applying a TransVW operation to the sampled 3D volumetric cubes.

3. The method of claim 1, wherein configuring the model with each of a discriminative encoder, a restorative decoder, and an adversarial encoder further comprises integrating each of a plurality of Self-Supervised machine Learning (SSL) operations into the model by incorporating instructions into the model for executing each of:

a jigsaw solving operation;

a deep clustering operation;

a Rubik's Cube operation;

a Rotation operation; and a TransVW operation.

4. The method of claim 1, wherein pre-training the discriminative encoder via discriminative learning comprises:

associating the medical image with computer-generated pseudo labels; and distinguishing the medical image associated with the computer-generated pseudo labels.

5. The method of claim 1, wherein training the pre-trained encoder-decoder of the model using joint discriminative and restorative learning comprises reconstructing the medical image from distorted variations thereof.

6. The method of claim 1, wherein associating the pre-trained encoder-decoder of the model with the adversarial encoder comprises associating the pre-trained encoder-decoder of the model with the adversarial encoder for discriminative, restorative, and adversarial learning to thereby pre-train the adversarial encoder.

7. A system comprising:

a memory to store instructions;

a processor to execute the instructions stored in the memory;

wherein the system is specially configured to execute instructions via the processor for performing the following operations:

receiving a medical image;

integrating instructions for performing a discriminative learning operation, a restorative learning operation, and an adversarial learning operation into a model for processing the medical image;

configuring the model with each of a discriminative encoder, a restorative decoder, and an adversarial encoder;

configuring each of the discriminative encoder and the restorative decoder of the model to be skip connected, forming an encoder-decoder of the model;

performing step-wise incremental training to incrementally train each of the discriminative encoder, the restorative decoder, and the adversarial encoder, by performing the following operations:

pre-training the discriminative encoder via discriminative learning;

attaching the pre-trained discriminative encoder to the restorative decoder to configure the encoder-decoder as a pre-trained encoder-decoder of the model;

training the pre-trained encoder-decoder of the model using joint discriminative and restorative learning;

associating the pre-trained encoder-decoder of the model with the adversarial encoder;

performing training of the pre-trained encoder-decoder of the model associated with the adversarial encoder through discriminative, restorative, and adversarial learning to render a trained model for the processing of a received medical image; and processing the medical image through the model using the trained model.

8. The system of claim 7, wherein the training of the pre-trained encoder-decoder of the model using joint discriminative and restorative learning comprises:

configuring Self-Supervised machine Learning (SSL) instructions to operate upon a three-dimensional (3D) medical image;

sampling a 3D volumetric cube from the 3D medical images;

applying a jigsaw solving operation to the sampled 3D volumetric cube;

applying a deep clustering operation to the sampled 3D volumetric cube;

applying a Rubik's Cube operation to the sampled 3D volumetric cube;

applying a Rotation operation to the sampled 3D volumetric cube; and applying a TransVW operation to the sampled 3D volumetric cube.

9. The system of claim 7, wherein configuring the model further comprises integrating each of a plurality of Self-Supervised Learning (SSL) operations into the model by incorporating instructions into the model for executing each of:

a jigsaw solving operation;

a deep clustering operation;

a Rubik's Cube operation;

a Rotation operation; and a TransVW operations.

10. The system of claim 7, wherein pre-training the discriminative encoder via discriminative learning comprises:

associating the medical image with computer-generated pseudo labels; and distinguishing the medical image associated with the computer-generated pseudo labels.

11. The system of claim 7, wherein training the pre-trained encoder-decoder of the model using joint discriminative and restorative learning comprises reconstructing the medical image from distorted variations thereof.

12. The system of claim 7, wherein associating the pre-trained encoder-decoder of the model with the adversarial encoder comprises associating the pre-trained encoder-decoder of the model with the adversarial encoder for discriminative, restorative, and adversarial learning to thereby pre-train the adversarial encoder.

13. A non-transitory computer readable storage media having instructions stored thereupon that, when executed by a process of a system specially configured for diagnosing disease within new medical images, wherein the instructions cause the system to perform operations including:

receiving a medical image;

integrating Self-Supervised machine Learning (SSL) instructions for performing a discriminative learning operation, a restorative learning operation, and an adversarial learning operation into a model for processing the received medical image;

configuring the model with each of a discriminative encoder, a restorative decoder, and an adversarial encoder;

configuring each of the discriminative encoder and the restorative decoder of the model to be skip connected, forming an encoder-decoder of the model;

performing step-wise incremental training to incrementally train each of the discriminative encoder, the restorative decoder, and the adversarial encoder, by performing the following operations:

pre-training the discriminative encoder via discriminative learning;

attaching the pre-trained discriminative encoder to the restorative decoder to configure the encoder-decoder as a pre-trained encoder-decoder of the model;

training the pre-trained encoder-decoder of the model using joint discriminative and restorative learning;

associating the pre-trained encoder-decoder of the model with the adversarial encoder;

performing training of the pre-trained encoder-decoder associated with the adversarial encoder through discriminative, restorative, and adversarial learning to render a trained model for the processing of the received medical image; and processing the medical image through the model using the trained model.

14. The non-transitory computer readable storage media of claim 13, wherein the training of the pre-trained encoder-decoder of the model using joint discriminative and restorative learning comprises:

configuring Self-Supervised machine Learning (SSL) instructions to operate upon a three-dimensional (3D) medical image;

sampling a 3D volumetric cube from the 3D medical image;

applying a jigsaw solving operation to the sampled 3D volumetric cube;

applying a deep clustering operation to the sampled 3D volumetric cube;

applying a Rubik's Cube operation to the sampled 3D volumetric cube;

applying a Rotation operation to the sampled 3D volumetric cube; and applying a TransVW operation to the sampled 3D volumetric cube.

15. The non-transitory computer readable storage media of claim 13, wherein configuring the model with each of a discriminative encoder, a restorative decoder, and an adversarial encoder further comprises integrating each of a plurality of Self-Supervised machine Learning (SSL) operations into the model by incorporating instructions into the model for executing each of:

a jigsaw solving operation;

deep clustering operations;

Rubik's Cube operations;

Rotation operations; and

Trans VW operations.

16. The non-transitory computer readable storage media of claim 13, wherein pre-training the discriminative encoder via discriminative learning comprises:

associating the medical image with a computer-generated pseudo label; and distinguishing the medical image associated with the computer-generated pseudo label.

17. The non-transitory computer readable storage media of claim 13, wherein training the pre-trained encoder-decoder of the model using joint discriminative and restorative learning comprises reconstructing the medical image from distorted variations thereof.

18. The non-transitory computer readable storage media of claim 13, wherein associating the pre-trained encoder-decoder of the model with the adversarial encoder comprises associating the pre-trained encoder-decoder of the model with the adversarial encoder for discriminative, restorative, and adversarial learning to thereby pre-train the adversarial encoder.

* * * * *